US012519906B2

(12) United States Patent
Jain et al.

(10) Patent No.: US 12,519,906 B2
(45) Date of Patent: Jan. 6, 2026

(54) MAPPING VIDEO CONFERENCING CONTENT TO VIDEO FRAMES

(71) Applicant: Adobe Inc., San Jose, CA (US)

(72) Inventors: Ajay Jain, San Jose, CA (US); Sanjeev Tagra, Bothell, WA (US); Sachin Soni, New Delhi (IN); David Kong, Princeton, NJ (US)

(73) Assignee: Adobe Inc., San Jose, CA (US)

( * ) Notice: Subject to any disclaimer, the term of this patent is extended or adjusted under 35 U.S.C. 154(b) by 216 days.

(21) Appl. No.: 18/226,740

(22) Filed: Jul. 26, 2023

(65) Prior Publication Data
US 2025/0039335 A1 Jan. 30, 2025

(51) Int. Cl.
*H04N 7/15* (2006.01)
*G06V 20/40* (2022.01)

(52) U.S. Cl.
CPC ............. *H04N 7/155* (2013.01); *G06V 20/49* (2022.01)

(58) Field of Classification Search
None
See application file for complete search history.

(56) References Cited

U.S. PATENT DOCUMENTS

2010/0306796 A1* 12/2010 McDonald .............. G06F 16/70
725/32
2023/0300430 A1* 9/2023 Mishra ............... H04N 21/4312

OTHER PUBLICATIONS

Adobe Blog, "Adobe and Microsoft Announce New, Deeper Integrations to Turbocharge the Modern Workplace" Available online athttps://blog.adobe.com/en/publish/2022/05/24/adobe-microsoft-announce-new-deeper-integrations-to-turbocharge-modern-workplace, May 24, 2022, 7 pages.

* cited by examiner

*Primary Examiner* — Hemant S Patel
(74) *Attorney, Agent, or Firm* — Kilpatrick Townsend & Stockton LLP

(57) ABSTRACT

Methods and systems for mapping video conferencing content to video frames are provided. In an example method, a processing device receives video conference information and a digital video, the digital video including a plurality of frames. The processing device segments the video conference information into one or more video-conference time segments and the digital video into one or more digital-video time segments. The processing device associates each video-conference time segment with a digital-video time segment. The processing device maps first content information of a first video-conference time segment of the one or more video-conference time segments onto a first digital-video time segment associated with the first video-conference time segment based a first identifier of the first content information. The processing device causes the first content information to be displayed during a displaying of the digital video.

20 Claims, 10 Drawing Sheets

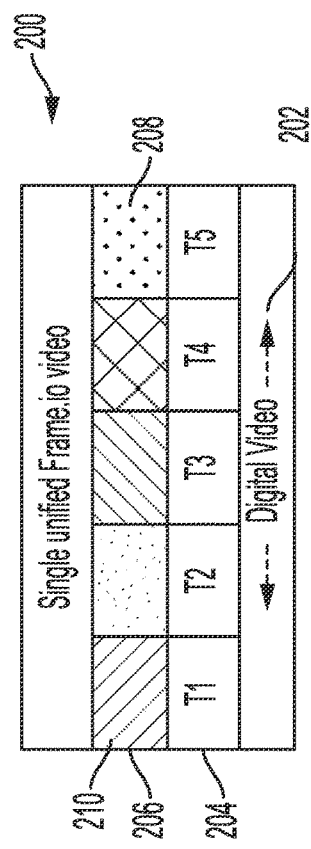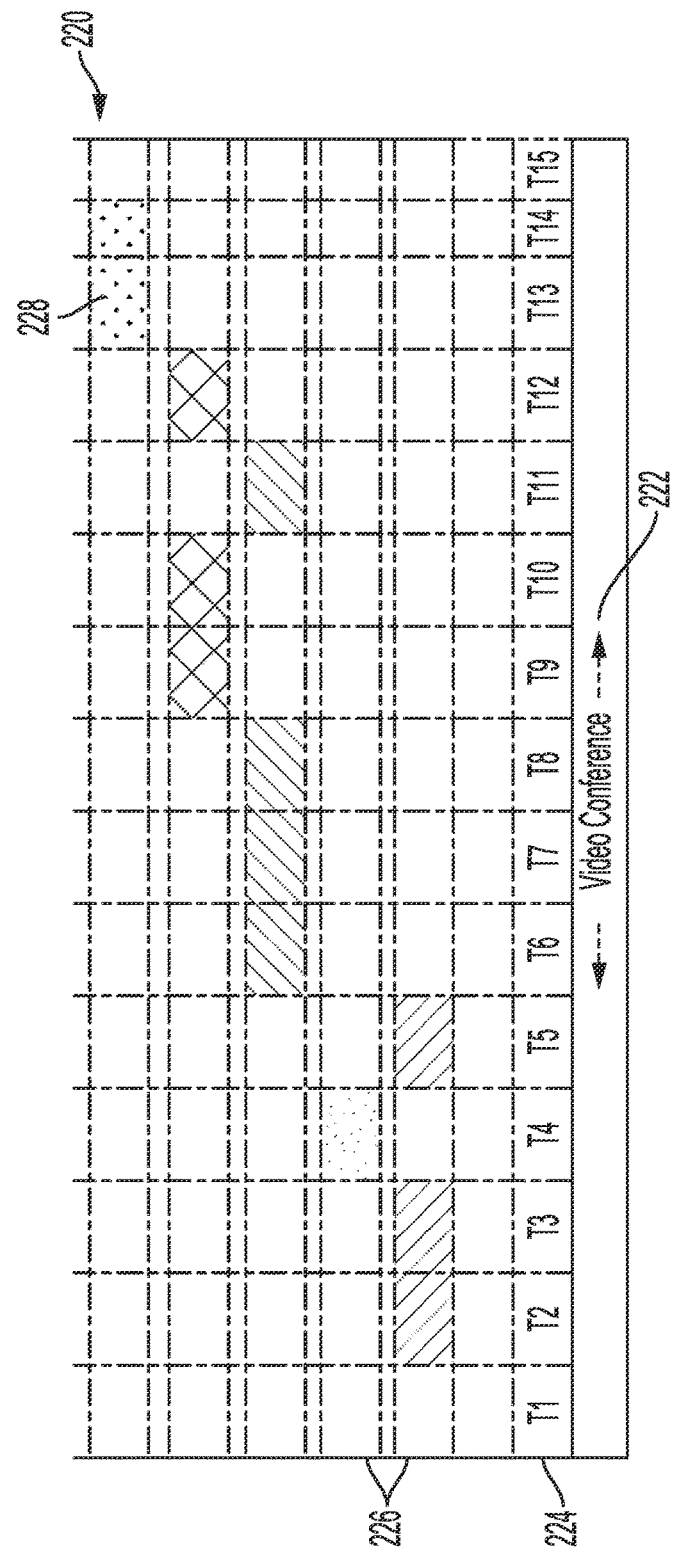
FIG. 2A
FIG. 2B

MAPPING VIDEO CONFERENCING CONTENT TO VIDEO FRAMES

TECHNICAL FIELD

This disclosure generally relates to systems and methods for video production. More specifically, but not by way of limitation, this disclosure relates to mapping of video conferencing content to digital video frames.

BACKGROUND

Video conferencing is an integral part of personal and business workflows. The proliferation of video conferencing tools has enabled collaborations among a variety of attendees and stakeholders. In parallel, video production pipelines have undergone a renaissance of their own, with web-based video production tools enabling distributed production teams to share content with ease, using a variety of affordable hardware and software technologies. The two technologies are often used together. Indeed, video conferencing tools and video production tools are a natural fit for remote collaboration.

One common use case involves video conference participants reviewing an image, document, or video together. For example, a presenter may share their screen and play a video to solicit reviews, discussion, feedback, or comments from other participants. While the video is played back by the presenter, the other participants may provide feedback through speaking, chat messages, reactions, annotations, and so on. The presenter may pause, rewind, or fast-forward the shared video as the collaborative discussion proceeds.

SUMMARY

Certain embodiments relate to mapping of video conferencing content to digital video frames. In an illustrative example, a processing device receives video conference information and a digital video including at least several frames. The video conference information may be a collection of data relating to a video conference that has taken place, during which the participants discussed the digital video that was played back during the meeting. For instance, the video conference information may be a collection of recorded video, audio, chat, and reaction data, recorded during a video production collaboration meeting.

The processing device segments the video conference information into one or more video-conference time segments and the digital video into one or more digital-video time segments. The processing device then associate each video-conference time segment with a digital-video time segment, such that each video-conference time segment includes at most one digital-video time segment. Some digital-video time segments may be associated to more than one video-conference time segment, which reflects the possibility that a video may be rewound or otherwise played more than once.

The processing device then maps content information extracted from a video-conference time segment onto the digital-video time segment previously associated with it. For instance, the processing device may extract a chat comment made during the video conference while a particular frame of the digital video was being displayed. The chat comment may be identified in the video conference information using an identifier, like an alphanumeric string. The chat comment is mapped onto the digital-video time segment using the identifier.

The processing device then can cause the mapped content information (e.g., the chat comment) to be displayed when the digital video is played back. For example, when the digital video is played back, a suitable playback module can be used to display the mapping information such that when the frames of the digital-video time segment mentioned in the previous paragraph are reached, both those frames and the mapped chat comment will be simultaneously displayed.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIGS. 2A-C show illustrations of video conference information and digital video segmentation and a subsequent mapping, according to some examples of the present disclosure.

DETAILED DESCRIPTION

Figure 1:
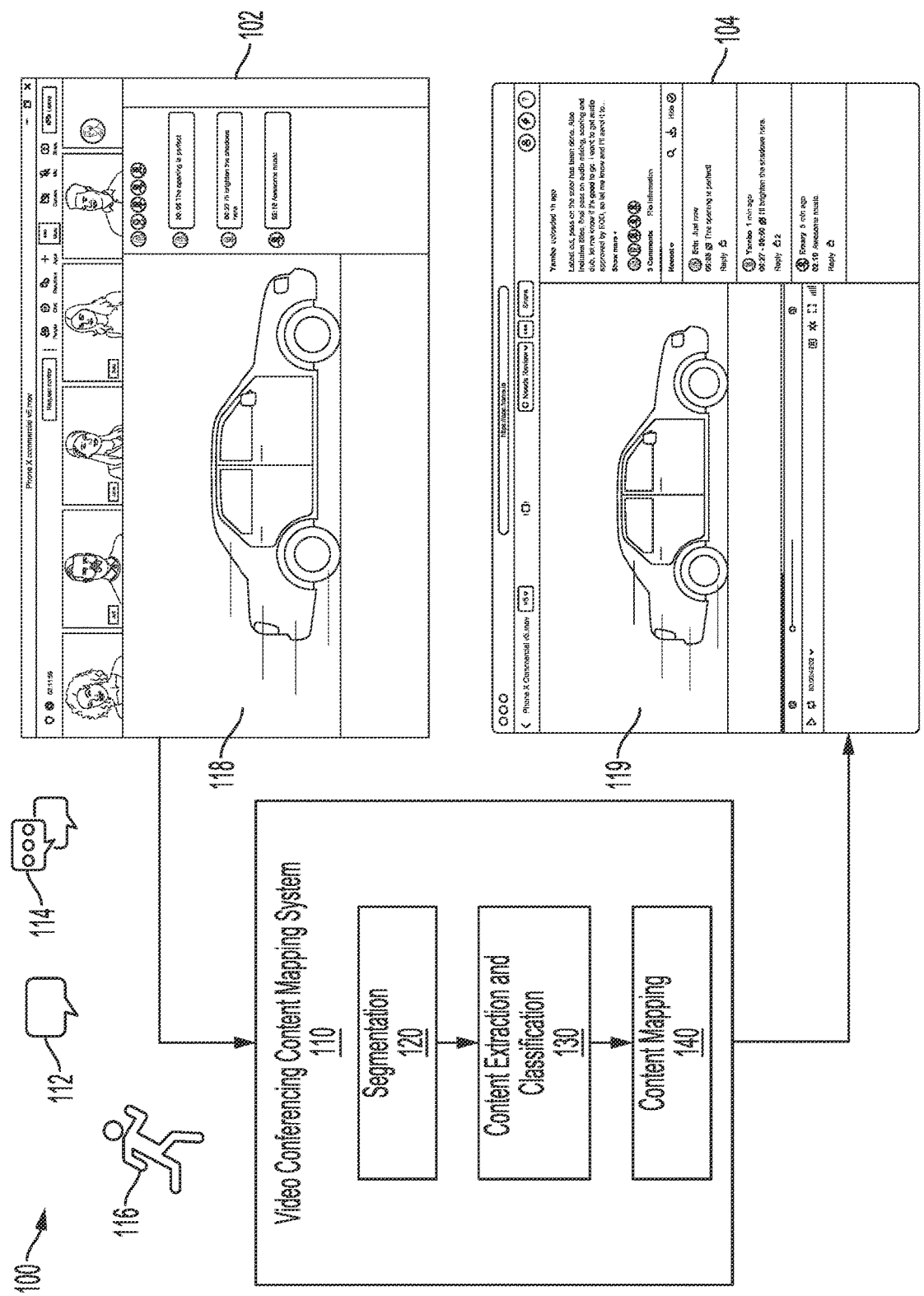
FIG. 1 shows an illustration of example environment for mapping video conference content to video frames, according to some examples of the present disclosure.

Online collaboration is now a standard part of personal and enterprise workflows. Video conferencing in particular has become a routine part of collaborations that were once conducted in an office setting. Now such collaborations among distributed stakeholders can occur remotely using a wide selection of technologies and tools.

A common collaboration scenario involves video conference participants reviewing an image, document, or video together. For example, a presenter may share their screen and play a video to solicit reviews, discussion, feedback, or comments from other participants. As the video is played, feedback may be relayed to the presenter or group in various forms. Participants may speak, use chat, gesture, react, add annotations, and so on. At the same time the video may be played, replayed, rewound, played at different speeds, or varied in other fashions.

The presenter, meanwhile, is faced with the conventional challenge of recording and collating feedback obtained from video conference participants, and later correlating such feedback to the chronological sequence of the video. For example, the presenter may keep careful notes, use a spreadsheet, or record and then later play back the video conference. The presenter must take this information and determine how and where it correlates to the video. In some cases, it may not even be possible to accurately make this correlation, as for example, when the presenter's notes are unclear or insufficient information was retained to determine what portion of the video a unit of feedback corresponded to. This manual process is complex, inefficient, and error-prone.

Certain embodiments described herein may be used to improve on the inefficient manual process described above by providing techniques for mapping video conferencing content to video frames. In a simple example, a system is configured to analyze collaboration events (e.g., comments, spoken words, annotations, reactions, whiteboarding, etc.) detected during a video conference while a video or other content is shared. The system can classify the detected events and map the detected events to the section, frame, or other suitable grouping in the underlying video that was onscreen during the detected event. The video can be rendered to include the mapped events such that when it is later played back, it displays the mapped events as the underlying video plays back. The system thus unburdens the presenter from the complex, manual task of correlating participant feedback in various forms to the source video, performs the mappings automatically, and frees up the presenter to perform the important work of collaboration.

In a more detailed example, a system for mapping video conferencing content receives video conference information and a digital video. The digital video includes a multitude of frames. The video conference information may include one or more video streams, one or more audio streams, chat message information, reaction information, annotation information, whiteboard data, metadata, user data, among other possible forms of information. For example, a video stream may include a video recording of the video conference, which may itself include some or all of digital video played back during the conference. The underlying digital video may only be visible for a portion of the time or may be interleaved with other content, like the contents of the presenter's desktop. The video conference information is in the form of data as recorded by the video conferencing platform and may not be able to be usefully or easily mapped to the underlying digital video without further processing.

At the video conferencing content mapping system, a segmentation module segments the video conference information into one or more video-conference time segments. Each video-conference time segment includes content information that includes the portion of the events and data making up the video conference information that occurred during that video-conference time segment. As described above, the content information may include one or more frames or partial frames from the digital video. The frames may not be unique within the video conference information; that is, the same frames may appear in multiple video-conference time segments as the digital video is played, rewound, and replayed, and so on.

The segmentation module also segments the digital video into one or more digital-video time segments. Each digital-video time segment may include one or more frames of the multitude of frames making up the digital video. However, in some preferred embodiments, the digital-video segments may only contain a single or minimal number of video frames. This is to ensure that content that is later mapped from the video conference information onto the underlying video is mapped as accurately as possible to the frame or frames during which the content was generated.

The segmentation module then associates each video-conference time segment with a digital-video time segment. The number of digital-video segments may differ from the number of video-conference segments. For example, 5 digital-video time segments may be associated with 10 video-conference time segments. Digital-video time segments may be repeated or skipped entirely, reflecting the underlying digital video being rewound or fast-forwarded. In a preferred embodiment, the digital-video segments have a time duration roughly comparable to the time duration of the video-conference time segments to obtain the most accurate mapping of content information to frames.

A content mapping and grouping module maps content information of a video-conference time segment onto the digital-video time segment associated with the video-conference time segment based on an identifier of the content information. For instance, the first identifier may be an alphanumeric string that uniquely identifies the location, timestamp, type, and name of a participant content item. In some cases, metadata included with the video conference information can include direct mapping information that can be used to map content items directly to digital-video time segments by the content mapping and grouping module. A content extraction module may also be used to identify some content information from a first video-conference time segment of the one or more video-conference time segments. The content extraction module may receive audio, video, and chat information from the first time segment and identify content items that are suitable for mapping to the underlying digital-video time segment.

The system includes one or more classifiers that receive audio, video, and chat content items from the content extraction module and classify them to determine an appropriate mapping. Classifiers may include a visual classifier, an audio classifier, or a textual classifier. For example, the visual classifier may be used to identify frames or other visual elements from the underlying digital video in the video stream included in the identified content information. Likewise, the audio classifier may identify words spoken by one or more participants and the textual classifier may identify chat comments or other typed annotations included in the identified content information.

The content mapping and grouping module maps the identified content information onto the digital-video time segment associated with the first video-conference time segment based a first identifier of the first content information. The mapping consists of associating the first identifier with the digital-video time segment associated with the first video-conference time segment. The content mapping and grouping module may perform steps for persisting the mapping including, for example, writing a suitable data structure directly to the underlying video file, maintaining a mapping in a separate file, or creating a mapping in a database, among other possibilities for generating and persisting the mapping. Likewise, content items may be grouped using a procedure suitable for grouping elements of content items from a video-conference time segment together on a digital-video time segment. For example, a binning procedure could be used whereby any chat messages performed inside a certain time bound are identified as grouped into a digital-video time segment.

The system then causes the mapped content information to be displayed during a displaying of the digital video. Mapped content information may be identified during playback using the first identifier. For example, the system may render the digital video, in which the rendered digital video includes the mapped content information. If the mapped content information is in a separate file, the mapping information from the file may be written onto the file containing the digital video as metadata. When the video is subsequently replayed using a suitable video player that can read the metadata, the mapped content information can be displayed back along with the video. For example, the digital video can be rendered showing the video along with a comments box that includes transcribed audio, chat comments, descriptions, annotations, and so on.

In some examples, the video conference information is received from a video conferencing platform. For example, the video conference platform may provide services for video conferencing among a various of participants. The services may use client software that provides participants with the ability to share content, chat, annotate, react, and so on. Likewise, the digital video is received from a video production server. The video production server may be included in the video conference platform or may be a standalone service. The video production server may provide client software and tools for video production, editing, and other related features.

In some examples, the content information displayed during the displaying of the digital video includes, among other things, textual chat messages or transcribed spoken words. For example, during the collaborative video conference, participants may comment on the underlying video through speech or chat. Speech can be transcribed, and chat messages can be minimally processed to be displayed as mapped content information during video playback. Likewise, the video conference information may include video streams, audio streams, chat message information, reaction information, or annotation information, among other possibilities.

In some examples, some second content information from the first video-conference time segment may be identified and mapped onto the first digital-video time segment based a second identifier of the second content information. In that case, the first and second content information are mapped as a group onto the first digital-video time segment associated with the first video-conference time segment. For example, the mapping may use a data structure that maps content information groups onto digital-video time segments, in which the content information groups may include one or more extracted content items.

Some embodiments of the present disclosure provide improvements in the field of video production, in particular including collaborative video production. The innovations of the present disclosure transform a highly complex and inefficient process into a highly effective process by intelligently analyzing collaboration events (e.g., comment, voice, text, etc.) from video conferencing platforms and subsequently mapping them to the precise frame or groups of frames of the underlying digital video being reviewed. Thus, upon playback, all relevant content information extracted from the video conference will then be replayed alongside the underlying digital video for future reference, which will then be easy to manage, respond back to, and act upon.

This technique thus not only improves the technical capabilities of the video production server but also helps increasing interoperability between the video conference platform and the video production server. These gains in efficiency and interoperability translate directly into increased revenues and time for further productions: improved collaboration among remote teams means teams will have more time for other collaborations. The disclosed system is highly configurable and allows video production work staff to selectively turn on this feature on demand, in consideration of the complexity of the video, content, and profile of the reviewers.

I. Overview

FIG. 1 shows an illustration of example environment 100 for mapping video conference content to video frames. Environment 100 includes a video conferencing content mapping system 110. Video conferencing content mapping system 110 may include a variety of components for enabling the mapping of content that are depicted at high level of generality in FIG. 1. One example embodiment is described in detail in FIG. 3. In general, the system 110 may include components for segmentation 120, content extraction and extraction 130, and for content mapping 140.

FIG. 1 depicts a user interface of both a video conferencing platform 102 and a video production server 104. The video conferencing platform 102 includes several participants, participating using both the audio and video capabilities of the platform, along with other tools like chat and configuration options. During the video conference, which may be recorded, a presenter is playing video 118 for review by the other participants. For example, the presenter may play the video using a screen sharing feature of the video conferencing platform. All other participants as well as the presenter themself may verbally comment 112, send related chat messages 114, or otherwise react 116 to video 118 as part of the collaborative process. Other forms of collaboration may be recorded as well.

The recorded information about the video conference, including audio and video streams, metadata, chat data, and so on, is received by the video conferencing content mapping system 110. The system 110 also receives information about the underlying video. For example, the system 110 may receive a copy of the underlying video in a format suitable for editing. Segmentation modules 120 segment the video conference information and the digital video into a plurality of respective segments. For instance, the video conference information may be segmented into 20 video-conference time segments and the video may be segmented into 10 digital-video time segments. The lengths of the video-conference segments may differ from the lengths of the digital-video segments.

The system includes content extraction and classification modules 130. For example, content extraction and classification modules 130 may identify spoken words, chat messages, physical actions, reactions like emojis, and so on. In some cases, content extraction modules may identify extracted content that may be incidental and can be ignored. Content classification modules may apply classifiers to extracted content relevant to the underlying video. For instance, visual classifiers can identify video frame(s) of the underlying video for precise, chronological content mapping, as well as identification of participant actions. For instance, a participant on camera may make a gesture like a "thumbs up" gesture that may be identified by the visual classifier. An audio classifier can identify spoken comments and a textual classifier can identify chat messages, and other annotations.

The system also includes content mapping modules 140. The content mapping modules 140 contain components for mapping the content information identified and classified by content extraction and classification modules 130 to the underlying digital video. For instance, the content information can be written to the digital video file as metadata or using another suitable format. Alternatively, the content information can be mapped using a separate mapping file including a suitable data structure. In yet another embodiment, the content information can be mapped using a database. For instance, a database table may relate content information to digital-video time segments or may group content information for subsequent mapping.

The system 110 may cause the mapped content information to be displayed during a displaying of the digital video. For example, the digital video including mapping information may be rendered and sent to video production server 104. The rendered digital video 119 can be played back using video production server 104, now including the mapping content information. For example, FIG. 1 depicts the mapped content information displayed alongside the video 119 during playback. The mapped content information may include chat messages, transcriptions of spoken comments, descriptions of other visual content, representations of reactions, and so on. Mapped content information is shown alongside the video 119 in accordance with times that the same frame or frames of video 119 were shown during video conference.

II. Overview of Segmentation and Content Information Mapping

Figure 2C:
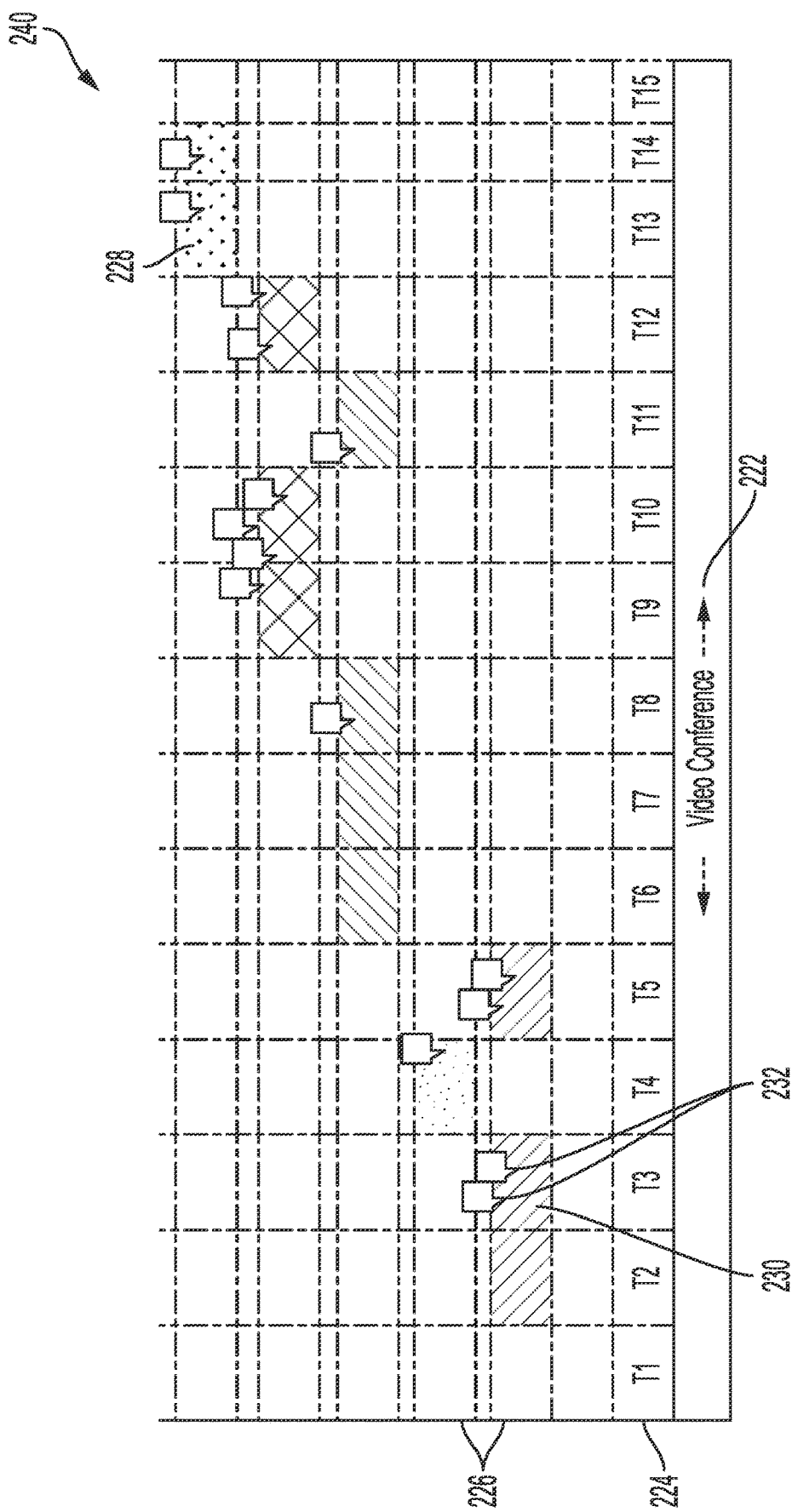

FIGS. 2A-C show illustrations of video conference information and digital video segmentation and a subsequent mapping. The illustrations of FIGS. 2A-C depict example implementations of approaches to segmentation intended to be non-limiting. One of ordinary skill in the art will immediately recognize that other approaches to segmentation and mapping may be used including alternative data structures, ordering, labels, topographies, and so on.

FIG. 2A is an illustration 200 of a digital video segmented into 5 digital-video time segments. The horizontal axis 202 corresponds to time, with time increasing to the right in association with the chronological ordering of the digital-video time segments (and the included digital video frames, discussed below). Each digital-video time segment 206 is labeled with labels 204 T1, T2, etc. However, these labels are arbitrary and are provided only for illustrative purposes. In program code, the digital-video time segments may be denoted using any suitable method. For example, references to the digital-video time segments may be stored in an array in which the ordered array elements correspond to the chronologically ordered digital-video segments.

Each digital-video time segment may include one or more digital video frames, represented in FIG. 2A with shading 208. The digital-video time segments may not have uniform length or each contain the same number of frames. In FIG. 2A, the digital-video time segments are depicted as approximately equal in size, but this is merely for illustrative purposes. For instance, a 1 minute digital video may include 100 frames. The digital video may be segmented into 5 segments, T1, T2, etc. In one example, each segment may be 12 seconds long and contain 20 frames. In another example, each segment may be of a different duration and contain a different number of frames. However, the sum of the lengths of the digital-video time segments sums to 1 minute and the sum of the number of frames contained in each digital-video time segment sums to 100.

FIG. 2B is an illustration 220 of video conference information segmented into 15 video-conference time segments. Illustration 220 further depicts the digital-video time segments of illustration 200 from FIG. 2A associated to the video-conference time segments of illustration 220. The horizontal axis 222 corresponds to time, with time increasing to the right in association with the chronological ordering of the video-conference time segments. Each video-conference time segment 226 is labeled with labels 224 T1, T2, etc. However, these labels are arbitrary and are provided only for illustrative purposes. In program code, the video-conference time segments may be denoted using any suitable method. For example, references to the video-conference time segments may be stored in an ordered associative array or hashmap in which the keys of the ordered associative array correspond to the video-conference time segments and the values of the ordered associative array include associated information about the digital-video time segments. The values may be references to digital-video time segments, specifications of included frames, collections of references to extracted content information, among other implementations.

The schematic inclusion of the digital-video time segment in illustration 220 represents the digital video being played back during the video conference. The shading 208 from illustration 200 corresponds to the shading 228 used in illustration 220. So, for example, video-conference time segment T13 includes the shading 228 corresponding to the shading 208 of digital-video time segment T5 from illustration 200. Thus, one or more of the frames included in digital-video time segment T5 were played back during video-conference time segment T13. In some examples, the illustration 220 may correspond to a mapping of digital-video time segments onto video-conference time segments.

FIG. 2C is an illustration 240 of extracted content mapped onto the video conference information depicted in FIG. 2B. Illustration 240 includes horizontal axis 222, labels 224, video-conference time segments 226, and shading 228, as in illustration 220. Illustration 240 also includes extracted content 232. For example, extracted content 232 may be spoken comments or typed chat comments extracted by content extraction and classification modules 130, as will be discussed further below. In FIG. 2C, extracted content 232 is grouped and mapped onto the segmented video-conference information using, for example, a binning procedure.

For example, video-conference time segment T3 includes the shading 230 corresponding to the shading 210 used to represent digital-video time segment T1 in illustration 200. During video-conference time segment T3, participants took actions as part of the collaborative process that were extracted by content extraction and classification modules 130, resulting in grouped, extracted content 232, represented by dialog icons in FIG. 2C. The extracted content 232 for video-conference time segment T3 is grouped together and mapped onto video-conference time segment T3, as illustrated in illustration 240.

III. Computing Environment

Figure 3:
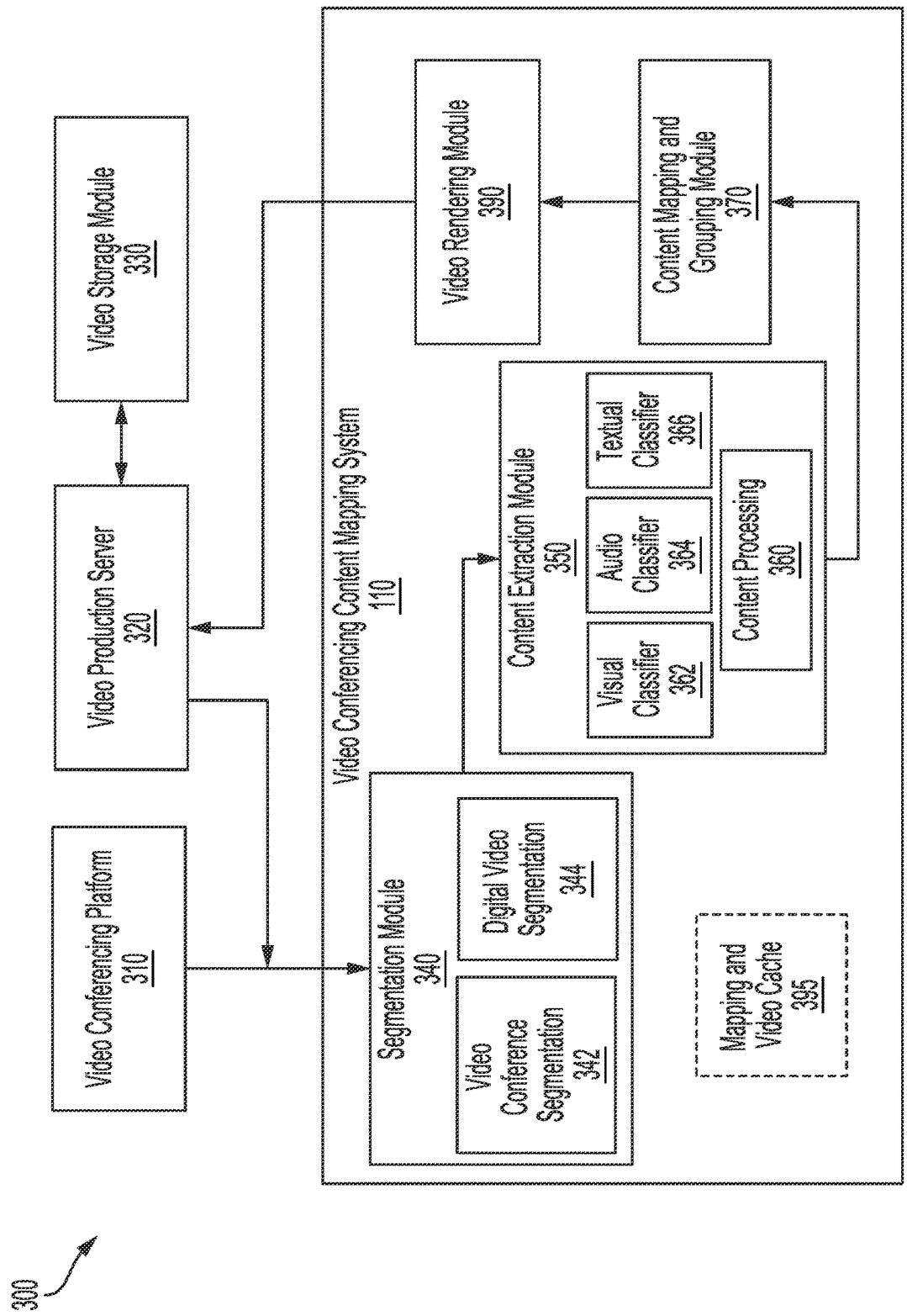
FIG. 3 depicts an example of an environment for mapping video conferencing content to video frames, including a video conferencing content mapping system, according to some examples of the present disclosure.

FIG. 3 depicts an example of an environment 300 for mapping video conferencing content to video frames, including a video conferencing content mapping system 110. Environment 300 shows a particular example implementation for the system 110 and associated high-level components shown in FIG. 1. Environment 300 includes a video conferencing platform 310 and a video production server 320. In some examples, video conferencing platform 310 and video production server 320 are provided by a single service or platform. However, in some other examples, they may be standalone services or platforms. For instance, a collaborating video production team may use a particular video conferencing platform 310 for video conferencing and a video production server 320 hosted by a different service, from which video data may be streamed or imported for sharing during video conferences.

The video conferencing platform 310 may be hosted on a server, collection of servers, cloud provider, or other suitable infrastructure for providing video conferencing services to users. The video conferencing platform 310 may include a plurality of participants, participating using both the audio and video capabilities of the platform, along with other tools like chat, collaboration tools, third-party applications, configuration mechanisms, among other functionality provided by the video conferencing platform 310. For example, Microsoft Teams® is a video conferencing platform 310 that be used for mapping of video conferencing content to video frames. These capabilities and tools may be provided to video conferencing participants by way of one or more client devices executing client software program code. The client devices may be laptops, desktops, smartphones, tablets, smartwatches, or other devices with suitable hardware and software installations for remote collaboration. For instance, the client devices may include input devices for receiving textual input via keyboard, audio input via microphone, display devices for viewing video content, and so on.

During a video conference hosted by the video conferencing platform 310, one participant may present content (e.g., a digital video) to other participants using, for example, a screen sharing function of video conferencing client software provided by the video conferencing platform 310. Video conference participants may verbally comment, send related chat messages, or otherwise react to the digital video as part of the collaborative process. Video conferencing platform 310 receives input from the participants collected by the various connected client devices. In some examples, video conferencing platform 310 is configured to record the video conference. The recording may include video of the conference, including video of the participants and any shared content, audio of shared content and of the participants, chats, annotations, reactions, actions taken using third-party applications, and transcription data, among other data and telemetry collected during the course of a video conference. Video conferencing platform 310 can store collected recording data in a suitable format for playback or transmission.

Video content may be shared or otherwise displayed during a video conference using digital video provided by video production server 320. Video production server 320 may be hosted on a server, collection of servers, cloud provider, or other suitable infrastructure for providing video production services. Video production server 320 may be a source for playing a digital video during the video conference as described above, but the video may be played from other sources as well. In order for the components of video conferencing content mapping system 110 to accurately map video conferencing content to digital video content, the video content that is displayed during the video conference should match the digital video sent to the segmentation module 340 in most cases. In some examples, video production server 320 may be a part of a web-based video production platform. For example, Frame.io® for Adobe Creative Cloud® is an example web-based video production platform 320 that be used for mapping of video conferencing content to video frames. In some examples, the video production server 320 may be integrated with the video conferencing platform 310 by way of, for instance, a plugin or extension.

Video production server 320 includes video storage module 330 for storage of video data, including associated audio data, metadata, transcripts, backups, variable resolution copies, and so on. Video storage module 330 includes digital videos as originally recorded, prior to editing or augmentation, as well as digital videos following editing or augmentation, including the addition of metadata by the video conferencing content mapping system 110. Video storage module 330 may be a component of the servers hosting video production server 320 or may be a standalone storage module including local hard disk storage or using a remote cloud storage provider. For example, video rendering module 390 can send the rendered digital video including the information, augmentation, and/or metadata associated with mapping of video conferencing content to video frames to video storage module 330 for storage and subsequent playback.

Information is sent from the video conferencing platform 310 and video production server 320 to the video conferencing content mapping system 110 to initiate mapping of video conferencing content to video frames. Video conferencing content mapping system 110 may include components for segmentation, storage, content extraction, content analysis, content mapping and grouping, and video rendering, among other components, in varying implementations. Video conferencing content mapping system 110 may be implemented in software, hardware, or a combination of both. The components of video conferencing content mapping system 110 may be included in one or more physical servers, remote servers, cloud compute server or other infrastructure as a service, or a combination thereof.

For example, video conferencing content mapping system 110 can receive information about the video conference, including audio and video streams, metadata, chat data, and so on, from video conferencing platform 310. The information may be sent in a format that is suitable for processing, analysis, and manipulation by the video conferencing content mapping system 110. In some examples, the video conference information may be a compressed archive including video data, audio data, chat data, and metadata in separate files. In some other examples, the video conference information may be streamed to the video conferencing content mapping system 110. In still other examples, the video conference information may be kept in a remote storage location accessible via query or request by the video conferencing content mapping system 110. For example, the video conferencing platform 310 may provide a secure download location via the secure file transfer protocol ("SFTP"), secure copy ("SCP"), or other suitable protocol.

Likewise, video conferencing content mapping system 110 can receive a digital video from video production server 320 in a suitable format for processing, editing, and/or augmentation, including the addition of metadata. The video production server 320 may send a video file or stream a video file, or as with the video conference information, can be provided upon query or request from a secure download location using a suitable protocol. In some examples, the video production server 320 may send a digital video corresponding to the video conference information sent by video conferencing platform 310 in response to a request or prompt from the video conferencing platform, which can ensure that the digital video(s) used during collaboration correspond to the video conference information sent by video conferencing platform 310.

Video conference information and the associated digital video(s) are received by segmentation module 340. Segmentation module 340 includes components for segmenting the received video conference information and the associated digital video(s) into time segments. Segmentation module 340 includes at least video conference segmentation 342 and digital video segmentation 344 components.

Video conference segmentation 342 generates video-conference time segments, which may include all of the information recorded during a given duration of a video conference, including video, audio, chat data, whiteboarding, transcripts, reactions, and so on. The video-conference time segments may be ephemerally stored as a collection of related data in mapping and video cache 395, discussed below. In some examples, video-conference time segments may be denoted in, for example, abstractions used by the program code making up content mapping and grouping module 370, with references to the video conference information. For instance, a particular video-conference time segment may be identified (e.g., cache keys or primary keys in a database) using a representation of the time bounds of the segment and/or representations of information about the included content items.

Digital video segmentation 344 generates digital-video time segments, which may include one or more frames from a given duration of a digital video, including video, audio, metadata, and so on. The digital-video time segments may be ephemerally stored as a collection of related data in mapping and video cache 395, as further discussed below. In some examples, digital-video time segments may be denoted in, for example, abstractions used by the program code making up content mapping and grouping module 370, with references to the underlying digital video. For instance, a particular digital-video time segment may be identified (e.g., cache keys or primary keys in a database) using a representation of the time bounds of the segment and/or other representations of the included frame(s) of the digital video.

For example, in one implementation, the video conference information may be segmented into 20 video-conference time segments by video conference segmentation 342 and the digital video may be segmented into 10 digital-video time segments by digital video segmentation 344. In this example, the time segments generated by video conference segmentation 342 and digital video segmentation 344 may be in-memory arrays of references to data structures containing the received video conference information and digital video, respectively.

The lengths of the video-conference time segments may differ from the lengths of the digital-video time segments. Likewise, the number of video-conference time segments may differ from the number of digital-video time segments. For example, consider a set of video conference information segmented into M time segments and a digital video segmented into N time segments. If N is less than or equal to M, then all portions of the digital video may be found played back during the video conference. However, some portions of the digital video may still not be found in the resulting mapping. For instance, some portions may be skipped or fast-forwarded past. N being less than or equal to M indicates that the entirety of the digital video may be, but not necessarily is, contained within the video conference. In contrast, if N is greater than M, then at least one portion of the digital video will not be mapped to the at least one portion of the video conference. In this case, it can be inferred that at least one portion of the digital video may have been skipped or fast-forwarded past during the video conference.

The system 110 includes content extraction module 350. Content extraction module 350 can identify content items included in the video conference information that are suitable for mapping to digital-video time segments. In some examples, the various functions of video conferencing client software or the activities of the participants therein can be segregated in accordance with the nature of the subsequent analysis used for information derived from those functions or activities. For example, for a client device including a chat pod, the information derived from the chat pod may be processed by textual classifier 366.

Content extraction module 350 may receive metadata included with the video conference information describing the video conference information or metadata from the video conferencing platform 310 relating to the various types of content that can be extracted from the information generated by the connected client devices. For example, content can be extracted according to functions mapped to various regions of the client device or client software included in the video stream of the video conference information. In some examples, the metadata included with the video conference information can include direct mapping information that can be used to map video-conference time segments directly to digital-video time segments by content mapping and grouping module 370 without any additional extraction or classification, as described below.

However, in some examples, content extraction module 350 can independently determine content to be extracted at runtime. In other examples, information to be extracted from the video conference information by the content extraction module 350 is determined while system 110 is configured. Furthermore, content extraction module 350 may identify extracted content that may be incidental and can be ignored. For example, content extraction module 350 may identify all content included with the video conference information that is suitable for processing by one of the classifiers of content extraction module 350 and forward them for processing, while disregarding the remaining content items. For instance, the video conference information may include performance or networking information about the video conference that is not relevant to the collaboration effort or underlying digital video that can be disregarded by the system 110.

The content extraction module 350 may include a visual classifier 362, an audio classifier 364, or a textual classifier 366 for classification of content items extracted. A video conferencing client may include functions that correspond to the available classifiers. An appropriate classifier can be chosen or designated based on metadata included with the video conference information. However, in some cases, the content extraction module 350 may determine the appropriate classifier for identified content items.

Various approaches can be taken by the classifiers for the determination of a suitable mapping procedure for each content item. For example, video conference information received as plain text and extracted by content extraction module 350 may be immediately classified by textual classifier 366 and processed for subsequent mapping by content processing 360. However, video conference information may be received as images or video, which can contain content that requires additional processing by statistical tools, computer vision modules, optical character recognition ("OCR") modules, machine learning models, and so on.

The classifiers may include machine learning ("ML") models that are trained to perform the appropriate classification operations. The ML models can be trained using supervised or semi-supervised methods to make classifications using label training data that includes examples of accurate classifications. For example, the visual classifier 362 may be trained using labeled examples of images or videos of people making certain gestures, icons, emojis, or other reactions that may appear during the video conference, visual effects that can be added to displays by certain video conference clients, and so on. The audio classifier 364 may be trained using labeled examples of human speech, music, sound effects, etc. The textual classifier 366 may trained using labeled examples of characters, words, phrases, sentences, etc. that are displayed in chat, overlayed onto the display, part of the underlying digital video, and so on. The classification operation performed by the classifiers may generate a probability to determine whether a given content item is relevant and should therefore be mapped. For example, chat comments or spoken words that are not related to the collaboration may be identified as not relevant and omitted from the mapping.

Any suitable ML model(s) and configurations may be used for classification. A non-limiting list of classification models may include Logistic Regression models, Support Vector Machines (SVM), k-Nearest Neighbors (k-NN) models, Decision Trees, Random Forests, Gradient Boosting Machines (GBM), AdaBoost, XGBoost, Artificial Neural Networks (ANN), Convolutional Neural Networks (CNN), Recurrent Neural Networks (RNN), Long Short-Term Memory (LSTM), Gated Recurrent Units (GRU), Naive Bayes Classifier, Linear Discriminant Analysis (LDA), Quadratic Discriminant Analysis (QDA) models, Gaussian Mixture Models (GMM), Hidden Markov Models (HMM), Multi-Layer Perceptrons (MLP), Bayesian Networks, Deep Q-Networks (DQN), Policy Gradient models, Actor-Critic models, Proximal Policy Optimizations (PPO), Generative Adversarial Networks (GAN) for classification, or Conditional GAN (cGAN) for classification.

In addition to traditional classification ML models, a large language model (LLM) can be used for classification tasks involving text, audio, or images. Some LLMs may be trained on large corpuses of text data to respond to plain-language prompts based on the patterns and structures learned from the training data. A non-limiting list of LLMs that may be used for the classification tasks of the present disclosure include Generative Pre-trained Transformer (GPT)-4, GPT-3, GPT-2, Bidirectional Encoder Representations from Transformers (BERT), Large Language Model Meta AI (LLaMA), Pathways Language Model (PaLM), Transformer-XL, and so on.

Visual classifier 362 classifies content appearing in visual form. Content appearing in visual form may include content being shown by the presenter as well as gestures, actions, reactions, etc. of all participants. Visual classifier 362 may analyze included information from among various components or functions of the client software to identify the visual content. For instance, the live video streams of the participants or their avatars, identification of participant actions, identification of video frame(s) of the underlying digital video for precise, chronological content mapping, along with any visually shared content may be analyzed by the visual classifier 362. For instance, a participant on camera may make a gesture like a "thumbs up" gesture that may be identified by the visual classifier 362. Spoken audio, music, or other noise captured during a video conference may be analyzed by the audio classifier 364. Textual input, including chat comments, whiteboarding, emoji reactions, and annotations may be analyzed by the textual classifier 366. Video conference information may include both audio data and transcribed audio data. Thus, classification of audio information may be performed by audio classifier 364 or textual classifier 366.

Classified content is received by content processing 360 and prepared for mapping to the underlying digital video. For instance, content items classified as chat data by textual classifier 366 can be extracted from the chat portion of the video conference information and added to a data structure suitable for mapping to the underlying digital video. In some examples, the data structure may be a machine-readable standardized or proprietary data structure appropriate for transmission or writing to a computer-readable medium. For example, XML, JSON, YAML, or another suitable standardized format may be used. In some examples, unstructured text-based, compressed, and/or binary data formats may be used which can economize on space and bandwidth.

The system 110 includes content mapping and grouping module 370. The content mapping and grouping module 370 includes components for mapping the content information identified and classified by content extraction module 350 to the underlying digital video. The mapping includes a process that associates extracted content items with the frame or group of frames to which the content items pertain. In some examples, metadata included with the video conference information includes information for directly mapping video-conference time segments to digital-video time segments by content mapping and grouping module 370, without added input from content extraction module 350.

In some examples, the segmented video-conference time segments may be associated with digital-video time segments using an array data structure. Each element of the array may correspond to a video-conference time segment. Further, each element can include an appropriate data structure that includes information including the corresponding digital-video time segment, if any (some portions/time segments of the video conference may not include a digital video being shared). The data structure may include all extracted and classified content items from content extraction module 350. For instance, the data structure can include a set that is an unordered collection of content items associated with each video-conference time segment/digital-video time segment pairing.

In this way, the content mapping and grouping module 370 effectively maps content items into bins corresponding to video-conference time segments and the associated digital-video time segments. In this sense, each video-conference time segment (and associated digital-video time segment) is a bin into which a plurality of content items can be mapped. When the mapped video is rendered and played back, the grouped content items can be shown simultaneously. This binning approach ensures that content mapped onto a particular frame or group of frames of the digital video is shown only when the particular frame or group of frames was discussed, commented on, reacted to, etc., regardless of when the actions occurred during the video conference.

The grouped mapping is received by video rendering module 390. The grouped mapping may be a data structure that includes all of the information processed and prepared by segmentation module 340, content extraction module 350, and content mapping and grouping module 370. For example, the data structure may be an array of sets of sub-data structures, as described above. In other examples, the mapped content is written to an in-memory cache, like mapping and video cache 395, using a plurality of keyed data structures.

The content information can be iteratively extracted from the appropriate data structure and subsequently written to the digital video file as metadata or using another suitable format. Alternatively, the content information can be mapped using a separate mapping file including a suitable data structure. In yet another embodiment, the content information can be mapped using a database. For instance, a database table may relate content information to digital-video time segments or may group content information for subsequent mapping.

The rendered digital video including mapping information is sent to video production server 320. The rendered digital video can be played back using video production server 320, now including the mapping content information. The mapped content information may include chat messages, transcriptions of spoken comments, descriptions of other visual content, representations of reactions, and so on. Mapped content information is shown alongside the digital video in accordance with times that the same frame or frames of digital video were shown during the video conference.

Mapping and video cache 395 may be used by the components of the video conferencing content mapping system 110 for temporary storage of video conference information and digital video, and the byproducts of extraction and analysis, enroute to the rendering of the mapped digital video at video rendering module 390. Mapping and video cache 395 may be an in-memory caching program implemented in software or hardware. For example, the segmented video-conference time segments may be stored as a collection of related data in mapping and video cache 395. Likewise, the segmented digital-video time segments may be ephemerally stored as a collection of related data in mapping and video cache 395. Mapping and video cache 395 can similarly be used for temporary storage of mapping information.

IV. Overview of Mapping Video Conferencing Content to Video Frames

Figure 4:
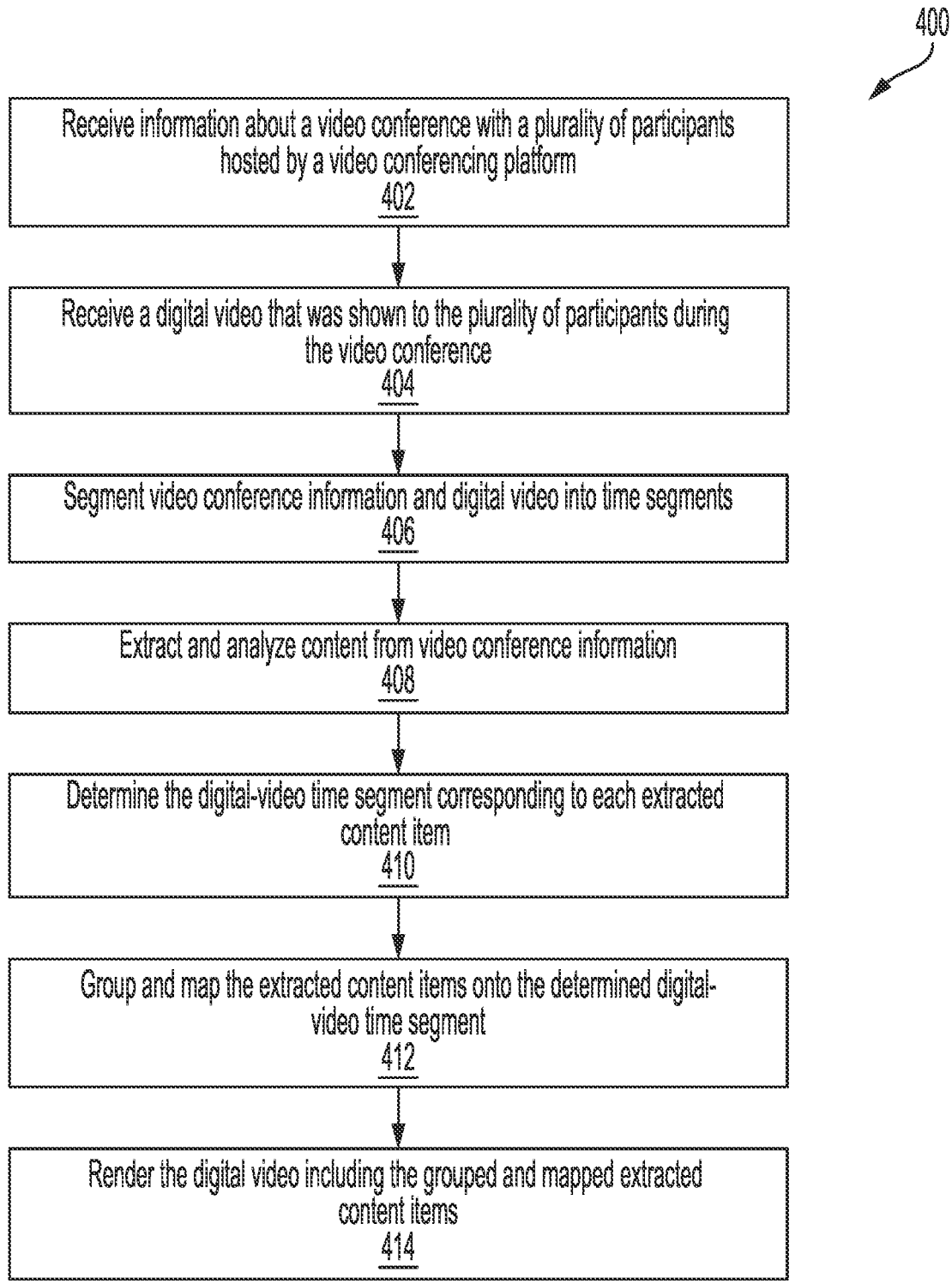
FIG. 4 shows a flowchart illustrating a process for mapping video conferencing content to video frames, according to some examples of the present disclosure.

FIG. 4 shows a flowchart of an example process 400 for mapping video conferencing content to video frames. For illustrative purposes, the process 400 is described with reference to the components illustrated in FIG. 3, though other implementations are possible. For example, in some implementations, the services of the video rendering module 390 may be provided using a server external to the video conferencing content mapping system 110. Similarly, the process 400 is described from the perspective of the video conferencing content mapping system 110, but other perspectives may be possible.

At block 402, the system 110 receives information about a video conference with a plurality of participants hosted by a video conferencing platform. During the video conference, one of the participants may share or otherwise cause to be displayed a digital video or videos for the purpose of collaborating during the video conference. For example, during the video conference, participants may speak, comment, react, or gesture during the sharing of the digital video to collaborate on its production. However, collaboration among the participants may take place in a variety of contexts including education, entertainment, historical, and so on. The video conference may be recorded using functionality provided by the video conferencing platform. The recording made by the video conferencing platform includes the video conference information, although it can be converted or otherwise adapted prior to transmission to the system 110.

The video conference information may include one or more video streams, one or more audio streams, chat data, annotations, reactions, metadata, synchronization data, configuration data, and other information that can relay the content of and relationship between the elements recorded during a video conference. The information may be sent in a format that is suitable for processing, analysis, and manipulation by the video conferencing content mapping system 110. In some examples, the video conference information may be a compressed archive including video data, audio data, chat data, and metadata in separate files. In some other examples, the video conference information may be streamed to the video conferencing content mapping system 110. In still other examples, the video conference information may be kept in a remote storage location accessible via query or request by the video conferencing content mapping system 110. A combination of these methods may be used. For example, the video portion of the video conference information may be streamed while chat data and metadata may be downloaded separately. The elements making up the video conference information may include timing information for synchronizing the components of the recorded video conference.

At block 404, the system 110 also receives the digital video that was shown to the plurality of participants during the video conference. The digital video may be shown in whole or in part during the video conference. It may be shown multiple times, as well as fast-forwarded, rewound, played in slow motion, and so on. The system 110 can use the copy of the digital video to accurately map the video conference information by providing a source reference for identifying the frames of the video included in the video conference information. For example, visual classifier 362 can be used to identify frames from the digital video that are included in video data included with the video conference information. For instance, the shared digital video may be partially blocked or obscured by other screen elements, shared data, etc. The visual classifier 362 may still be able to identify the frames of the underlying digital video using computer vision and other machine learning techniques. In some examples, visual classifier 362 may be able to identify frames by utilizing timing information about the video recorded by video conferencing platform 310 during the meeting and included in the video conference information.

The digital video may be received in any suitable format for segmentation, editing, and mapping. For example, the system 110 may segment the digital video file into a plurality of digital-video time segments, which may themselves be video files. For example, the digital video file may be received as a MPEG-4 (MP4) file, a QuickTime Movie (MOV), an Audio Video Interleave (AVI) file, a Windows Media Video (WMV) file, a Flash Video (FLV) file, and so on. In some examples, video production server 320 is integrated with video conferencing platform 310 via an extension or plugin, which can be used as a channel to relay the digital video and other metadata such as timestamps, annotations, bookmarks, etc. to the system 110.

At block 406, the system 110 segments the video conference information and digital video into time segments. The segmentation process for video conference information may be performed by a video conference segmentation 342 component. Segmenting video conference information can include an actual or logical segmentation of the video conference into durations. The durations need not be necessarily equal. For instance, an extended video conference may include digital video sharing during only a portion of the video conference. In some examples, the portions of the video conference that do not include shared content may be grouped into time segments of arbitrary length. In some embodiments, the video-conference time segments during the portions of the video conference that include shared video content are of equal duration. In some other embodiments, the video-conference time segments during the portions of the video conference that include shared video content are of a duration that is inversely proportional to the amount of content in each video-conference time segment in order to ensure an even distribution of information across time segments for performance reasons.

Likewise, digital video segmentation 344 component may be used to segment the received digital video. Each digital-video time segment includes one or more frames of the underlying digital video. In a preferred embodiment, the digital video segmentation 344 component segments the digital video into segments including a minimal number of frames. The digital video segmentation may be as small as a single frame. A smaller number of frames in the digital-video time segments correspond to greater accuracy in mapped content items. For instance, if a digital-video time segment contains 100 frames of video, a viewer of the mapped content included in the rendered video may not be able to determine which of the 100 frames the mapped content corresponds to because the mapped content appears at once, resulting in a poor user experience due to confusion. However, the required frame resolution of the digital-video time segments may vary depending on various factors including the nature of the video, the time density of video conference information, memory and storage availability, performance considerations, and so on.

At block 408, the system 110 extracts and analyzes content from video conference information. For example, a content extraction module 350 may be used to extract, from each element of the video conference information, content items that may be mapped onto the underlying digital video. For instance, during a recorded video conference, two videos may be shared, during which the participants comment orally and in chat, pertaining to the videos, while the videos are being shared. The recorded video conference information may include video of the recorded conference, audio of the recorded conference, a structured text document containing a record of the chat during the conference, an audio transcript, and metadata about the video conference. Content extraction module 350 can identify discrete content items in each element of the video conference that may be mapped. For instance, short segments of the recorded video may contain gestures by the participants. Verbal comments by participants can be extracted as audio files or as text segments from the transcript. Textual comments can be extracted from the record of the chat. In some examples, metadata included with the video conference information includes information for directly mapping video-conference time segments to digital-video time segments by content mapping and grouping module 370, without added input from content extraction module 350.

The exacted content items are classified using one or more of the visual classifier 362, audio classifier 364, or textual classifier 366, or similar classifier components, to identify the appropriate handler in content processing 360 for constructing a mappable content item. For instance, the visual classifier may classify a particular gesture in an extracted video segment as a describable reaction that can be mapped to underlying video. Content processing 360 converts extracted and classified content items into a machine-readable format that is suitable for mapping to the underlying digital video or videos.

At block 410, the system 110 determines the digital-video time segment corresponding to each extracted content item. The video conference information may include synchronizing metadata to ensure that each extracted content item is accurately mapped to the moment during the video conference that the underlying video was shared and the participant action with the given content item was taken. In cases where synchronizing metadata is not available, visual classifier 362 may be used to identify the underlying video frames displayed in the video conference and to establish the temporal link between the time segment pairing. Thus, the content mapping and grouping module 370 may use the synchronizing metadata to map content items into time-bounded bins corresponding to video-conference time segments and their associated digital-video time segments. In this sense, each video-conference time segment (and associated digital-video time segment) is a bin into which a plurality of content items can be mapped. When the mapped video is rendered and played back, the grouped content items can be shown simultaneously. This binning approach ensures that content mapped onto a particular frame or group of frames of the digital video is shown only when the particular frame or group of frames was discussed, commented on, reacted to, etc., regardless of when the actions occurred during the video conference.

At block 412, the system 110 groups and maps the extracted content items onto the determined digital-video time segment. Using the time bounds determined in block 410, the content mapping and grouping module 370 places each content item into a data structure element corresponding to the video-conference time segments/digital-video time segments pairing. Each such element can contain a plurality of content items in accordance with the binning approach described above. The grouped and mapped content items may be placed into an in-memory or on-disk data structure, or ephemerally stored in mapping and video cache 395 using a suitable keying scheme. For example, mapping and video cache 395 may use keys that include information identifying a unique identifier of the video conference, the video-conference time segment, the digital-video time segment, the time of the content item and/or the time during the underlying video in which the content item was generated, and the serial or sequence number of the content item, among other descriptive data.

At block 414, the system 110 renders the digital video including the grouped and mapped extracted content items. For example, video rendering module 390 may receive the data structure or otherwise ephemerally-stored information generated by content mapping and grouping module 370 and associate it with the associated frame or frames of the underlying video(s). In some examples, the mapping content items can be mapped directly onto the video file representing the digital video. For instance, some video file formats may allow for the inclusion of video metadata directly onto the video file. In some examples, the mapped content items may be stored in a separate file that includes suitable synchronization information needed to display the mapped content at the appropriate time during video playback. In cases where synchronizing metadata is not available, visual classifier 362 may be used to identify the underlying video frames displayed in the video conference and to establish the temporal link between the time segment pairing. Likewise, mapping information can be stored in a remote location like a database or remote filesystem. In the case where the mapping information is stored separately from the digital video, the playback infrastructure must have access to both simultaneously. For example, if video production server 320 is used for augmented video playback that includes the mapping information, it may retrieve the mapping information and display it separately from the digital video. For instance, the mapping information can be overlaid onto the digital video or shown in a separate window.

Figure 5:
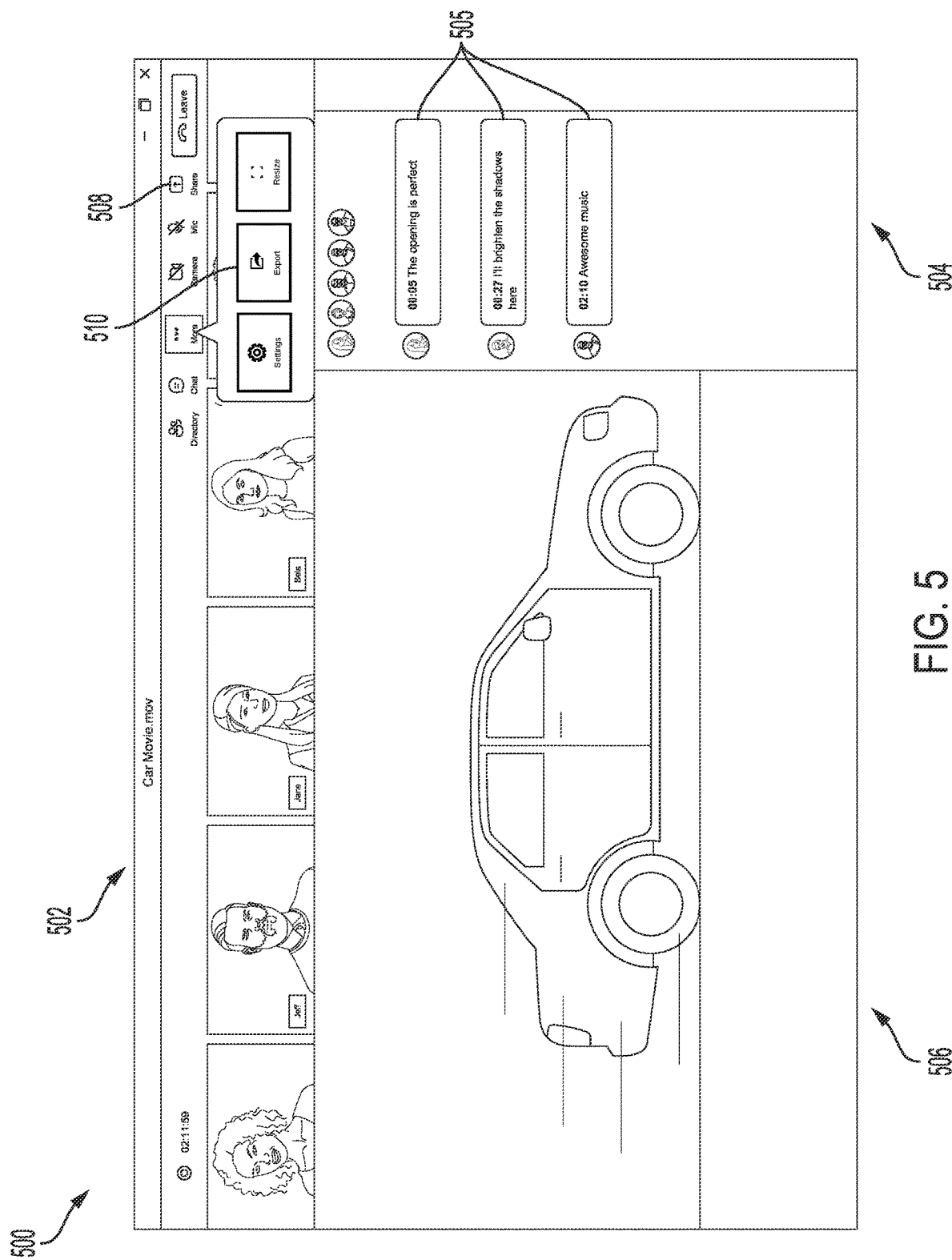
FIG. 5 depicts an illustration of an example video conferencing platform used for mapping video conferencing content to video frames, according to some examples of the present disclosure.

FIG. 5 depicts an illustration of an example video conferencing platform 500 used for mapping video conferencing content to video frames, according to some examples of the present disclosure. Example video conferencing platform 500 may exemplify a user interface provided to a client device used by a video conference participant. One of ordinary skill in the art will immediately recognize that the video conferencing platform 500 depicted in FIG. 5 is merely an example and that different variations and configurations are possible.

The user interface for example video conferencing platform 500 depicted may include several sections, each of which may contain an element of video conference information that can be recorded and subsequently mapped to an underlying digital video. For instance, platform 500 may include a participants section 502. Participants section 502 includes live images, representations, or avatars of the video conference participants. Thus, for example, because the live-streamed image of attendees may be captured in a video conference recording including participants section 502, the movement within the attendees' frame or avatars may also therefore be captured. In some examples, visual classifier 362 can identify certain movements that can be extracted and mapped to the underlying digital video. For instance, if a participant responds to a question with a thumbs-up gesture without verbal comment, visual classifier 362 can identify the gesture, which can be textually mapped (i.e., described) by content mapping and grouping module 370.

Platform 500 may include a chat section 504. Chat section 504 may include a chat pod hosting chat content input by video conference participants during collaboration or to otherwise communicate with each other. Participants may enter textual chat messages or show reactions using emojis or other symbols. In some examples, the chat pod may be used for other messaging content. For example, other content may be posted to the chat pod including documents, web links, attachments, images, sound files, etc. The classification components of content extraction module 350 may be used to identify content items for mapping. For instance, the textual classifier 366 can identify chat messages input by participants that may be extracted and classified as relevant to the underlying digital video. Chat section 504 includes several example chat messages 505 that may be extracted and classified for later display during playback of the underlying digital video.

Platform 500 may include a display section 506. When a participant is causing a digital video to be shown during a video conference, for example, by sharing video content, it can be displayed in display section 506. Display section 506 can also display other participants, multiple shared content items, and so on, according to the configuration of the particular client device and/or video conferencing client software. In some examples, when a digital video is being shown, visual classifier 362 can identify the frames of the underlying digital video that can be used to map video-conference time segments to digital-video time segments.

Platform 500 may include a share button 508 that can be used by a video conference participant to share content. For example, a presenter participant may share a digital video using this function. In some implementations, sharing can be accomplished through sharing of a screen, which refers to mirroring the contents of a client device display to the other participants. Such a method of screen sharing may include many other visual elements beside the digital video (e.g., other applications, icons, taskbars, etc.). Visual classifier 362 may determine portions of the shared screen that contain information that can be extracted and mapped. In some implementations, digital video can be shared directly, in which case the shared content fills up the entire or a fixed portion of the display. In still other implementations, content can be shared by streaming from a third-party. Some examples may include a capability to share/stream a digital video from a video production server 320. In this case, the video conferencing client software may require program code for integrating the stream of the third-party into the entire or a fixed portion of the shared display.

Platform 500 may include an export button 510. Export button 510 may be used to export both the video conference information and the underlying digital video to the video conferencing content mapping system 110 for mapping of the video conference information to the digital video. In some examples, export button 510 may be disabled/greyed out in the event that the video conference has not been or is not being recorded. For this reason, some third-party integrations may cause notifications, warnings, or reminders at the beginning of a video conference or video sharing to record the video conference. In some examples, if the digital video was shared by the presenter from a local storage device or personally-controlled remote storage location, pushing of the export button 510 may prompt a dialog box that will allow the participant presenter to select the location of the stored video to send to system 110 along with the video conference information.

Figure 6:
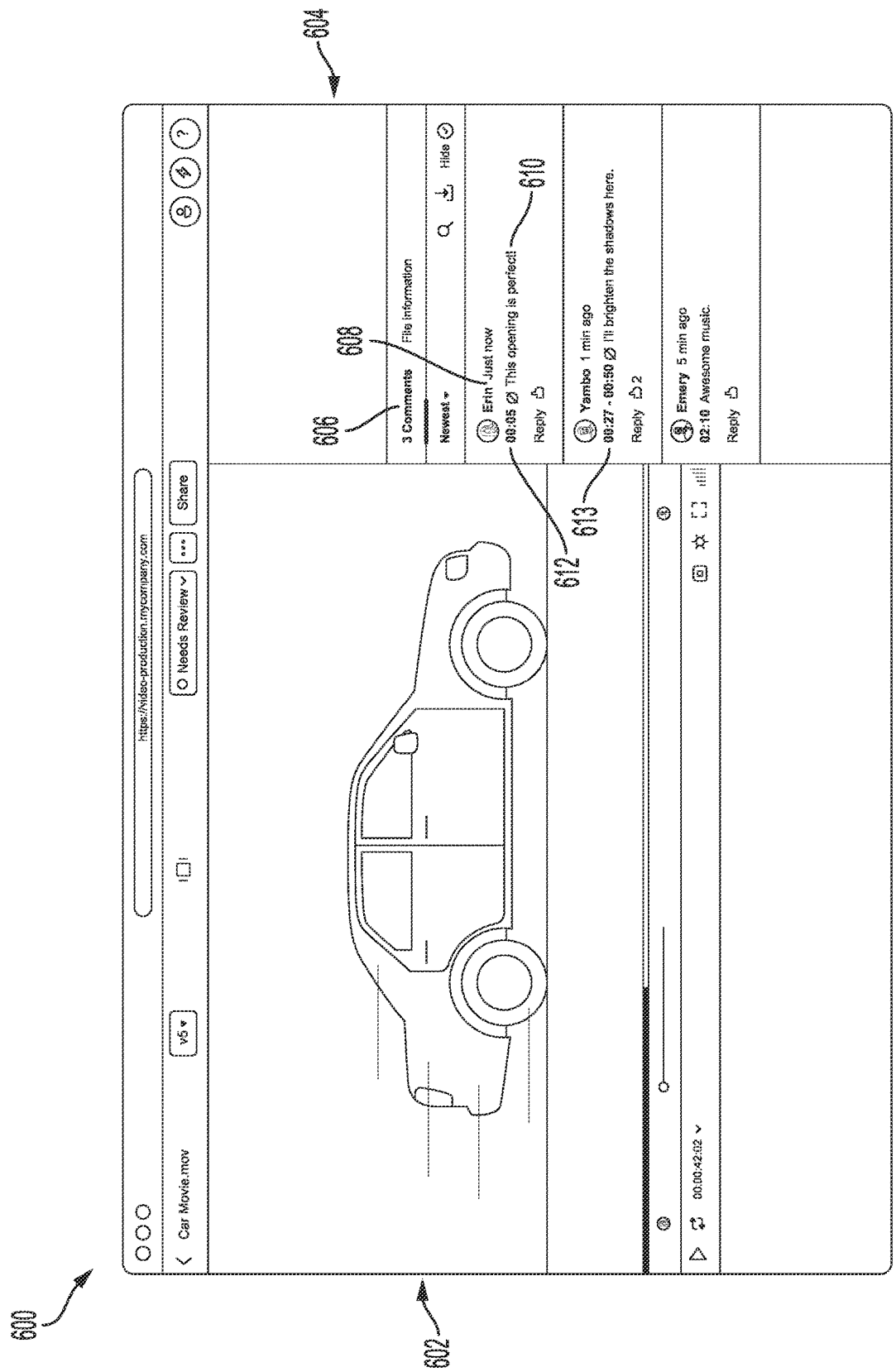
FIG. 6 depicts an illustration of an example video production server used for mapping video conferencing content to video frames, according to some examples of the present disclosure.

FIG. 6 depicts an illustration of an example video production server 600 used for mapping video conferencing content to video frames, according to some examples of the present disclosure. Example video production server 600 may exemplify a user interface provided to a client device after the video conferencing content mapping system 110 has mapped content items to the underlying digital video and rendered the augmented video. One of ordinary skill in the art will immediately recognize that the video production server 600 depicted in FIG. 6 is merely an example and that different variations and configurations are possible.

Example video production server 600 includes a display area 602. Display area 602 shows, upon playback, the digital video that was shared during the video conference. In some examples, video production server 320 uses the original digital video file or a copy of the digital video file augmented with mapped content items.

Example video production server 600 includes a mapped content section 604. Content items extracted, classified, mapped, grouped, and rendered by video conferencing content mapping system 110 are shown in section 604 as the corresponding frame or frames from the underlying digital video are played back in display area 602. The digital video is segmented into a plurality of digital-video time segments, each of which includes a frame or group of frames. The video conference information is similarly time-segmented. Each video-conference time segment/digital-video time segment pairing is thus associated with a frame or frames that have an associated duration or frame number bounds. Mapped content items are grouped or binned into time segment pairs such that they are displayed, simultaneously, when the associated digital video frames are shown.

Within section 604, the mapped content items may be shown. For example, the chat message 505 from FIG. 5 are shown mapped here to the corresponding video frame shown in display section 506/display area 602. Although only a single frame is depicted in FIGS. 5 and 6, a plurality of frames may be included in digital-video time segment. Mapped content in mapped content section 604 may include transcribed oral comments, text comments, reaction information, gestures, shared documents, and so on. For instance, section 604 may include a mapped content item count 606 showing the number of content items mapped to the displayed frame or frames. An avatar or image 608 of the creator of the content item may be shown. The content item may include a timestamp 612 indicating the time from the video conference or from the digital video at which the content item was created. In some examples, the timestamp may be a timestamp range 613, indicating a duration of time over which the content item was created. The content item 610 is shown in example video production server 600 as text. For example, in this case, the text of chat messages 505 was mapped to the digital video. Likewise, transcribed comments of oral comments (or transcribed spoken words), descriptions of reactions, translations, emojis, shared documents, can be similarly mapped. In some examples, the system 110 can be configured to show video and audio clips from the video conference information mapped directly to the digital video, with no conversion to text. The format of the mapping made after content is extracted can be configured using a suitable GUI (not shown).

V. Process for Mapping Video Conferencing Content to Video Frames

Figure 7:
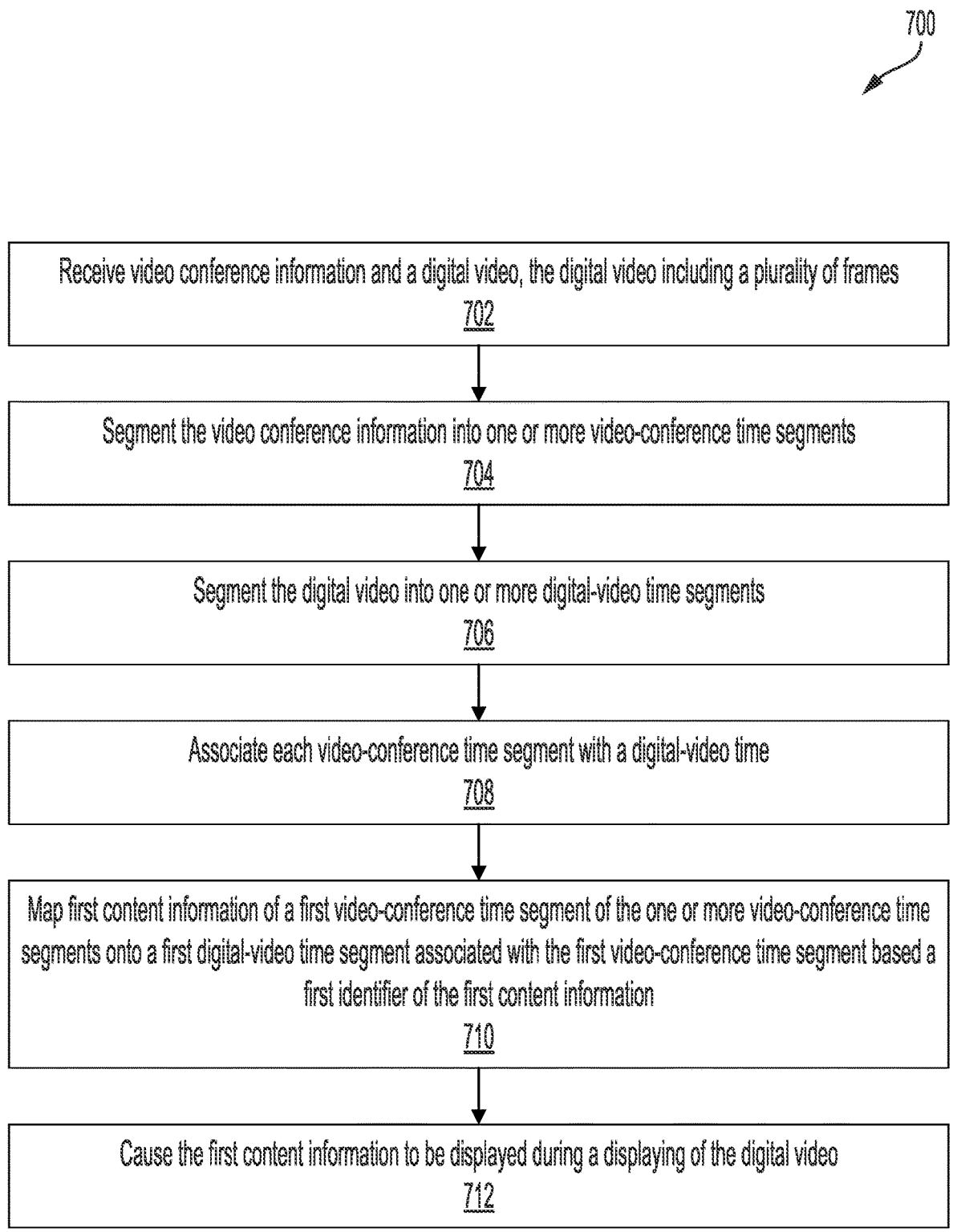
FIG. 7 illustrates an example process for mapping video conferencing content to video frames, according to some examples of the present disclosure.

FIG. 7 illustrates an example process 700 for mapping video conferencing content to video frames. For illustrative purposes, the process 700 is described with reference to the components illustrated in FIG. 3 from the perspective of the video conferencing content mapping system 110, though other implementations are possible. For example, the content processing component 360 may be a standalone component in some implementations.

At block 702, the system 110 receives video conference information and a digital video, the digital video including a plurality of frames. The video conference information may be received from, for example, a video conferencing platform. The video conference information may include one or more video streams, one or more audio streams, chat message information, reaction data, annotation information, metadata, user data, among other possible forms of information. For example, a video stream may include a video recording of the video conference, which may itself include some or all of digital video played back during the conference. For instance, the underlying digital video may only be visible for a portion of the time or may be interleaved with other content, like the contents of the presenter's desktop.

In some examples, a plurality of videos may be shown during a video conference. In that case, a mapping can be performed for each video. The digital video segmentation 344 may be configured to generate time segments of each digital video but to track all time segments in a single data structure for association with the received video conference information. In some examples, other shared or displayed content besides videos may be mapped to. For instance, certain examples may be configured for mapping video conference information to shared documents, audio, games, etc.

The video conference information is in the form of data as recorded by the video conferencing platform and may not be able to be usefully or easily mapped to the underlying digital video without further processing. In some examples, the video conference information may be a compressed archive including video data, audio data, chat data, and metadata in separate files. In some other examples, the video conference information may be streamed to the video conferencing content mapping system 110. For instance, the video conference information may be streamed in a proprietary, custom data format that includes the various elements of the video conference information in a suitable data structure. In still other examples, the video conference information may be kept in a remote storage location accessible via query or request by the video conferencing content mapping system 110.

The digital video may be received from a video production server. The digital video or videos (hereafter "digital video") may include a plurality of frames. The full-sized frame of the digital video may be included in part or in whole in a video stream of the video conference information. For instance, the shared digital video may be partially blocked or obscured by other screen elements, shared data, etc. The digital video may be sent to the system independently of the video conference information. The video production server 320 may be associated with the video conferencing platform or may be a standalone service or server.

The digital video may be shown in whole or in part during the video conference (e.g., the entire video is not shown). It may be shown multiple times, as well as fast-forwarded, rewound, played in slow motion, and so on. Thus, the frames may not be unique within the video conference information; that is, the same frames may appear in multiple video-conference time segments as the digital video position is scanned during the video conference. Therefore, the system 110 receives a copy of the digital video itself, so that the video conference information can be accurately mapped onto the digital video by identifying the frames of the video itself in the video included in the video conference information. In some examples, video classifier 362 may be used to identify frames of the digital video to map content information onto.

The digital video may be received in any suitable format for segmentation, editing, and mapping. For example, the system 110 may segment the digital video file into a plurality of digital-video time segments, which may themselves video files. For example, the digital video file may be received as a MPEG-4 (MP4) file, a QuickTime Movie (MOV), an Audio Video Interleave (AVI) file, a Windows Media Video (WMV) file, a Flash Video (FLV) file, and so on. Alternatively, the digital video may be streamed to the system 110 from video production server 320.

At block 704, the system 110 segments the video conference information into one or more video-conference time segments. In some examples, each video-conference time segment may include content information (content items) including the video conference information associated with that video-conference time segment. The video conference information can be segmented into a number of segments such that each segment includes a suitable amount of content information for mapping onto one or more underlying digital video frames. A choice of time-segment length too long may result in an excessive amount of content items being mapped to a frame or frames. An excessive amount of content may correspond to more information than can be practically reviewed during playback. In a preferred embodiment, the time-segment length/number is chosen such that the corresponding digital-video time segments contain one or a minimal number of frames. In certain embodiments, the system 110 can dynamically select the length or number of video-conference time segments based on parameters such as the volume of video conference information received, data about the underlying digital video, memory and storage constraints, and so on.

At block 706, the system 110 segments the digital video into one or more digital-video time segments. Each digital-video time segment may include one or more frames of the plurality of frames of the digital video. However, in some preferred embodiments, the digital-video segments may only contain a single or minimal number of video frames. This is to ensure that content that is later mapped from the video conference information onto the underlying video is mapped as accurately as possible to the frame or frames during which said content was generated.

Digital video frames or groups of frames may be identified using a suitable representation for subsequent reference in mapping data structures. For instance, the time segments of the digital video may be referenced using time bounds, frame numbers, or memory locations or the like. In some examples, segmentation of the digital video is performed only by reference and the underlying copy of the digital video remains intact. In some other examples, the digital video file is segmented into a plurality of smaller video files, each file corresponding to a digital-video time segment.

At block 708, the system 110 associates each video-conference time segment with a digital-video time segment. The number of digital-video segments may differ from the number of video-conference segments. For example, the digital-video segments may contain a single frame or a plurality of frames. In a preferred embodiment, the digital-video segments have a time duration roughly comparable to the time duration of the video-conference time segments.

An abstraction for the association may be captured using an ordered associative array or hashmap in which the keys of the ordered associative array correspond to the video-conference time segments and the values of the ordered associative array include associated information about the digital-video time segments. The values may be references to digital-video time segments, specifications of included frames, collections of references to extracted content information, among other implementations. For example, consider video conference information segmented into video-conference time segments V1 and V2 and a digital video segmented into digital-video time segments D1 and D2. An associative array or similar data structure can be used to track the association. In pseudocode this may be written as (V1=>D1, V2=>D2).

At block 710, the system 110 maps first content information of a first video-conference time segment of the one or more video-conference time segments onto a first digital-video time segment associated with the first video-conference time segment based a first identifier of the first content information. For example, the system 110 may identify the first content information from a first video-conference time segment of the one or more video-conference time segments. The content extraction module 350 may receive audio, video, and chat information from the first time segment and identify content portions that may be suitable for mapping to the underlying digital-video time segment.

Content portions may be identified in the video conference using an identifier. For example, an alphanumeric string may be used to uniquely identifier a particular content portion. The alphanumeric string may include serialized or encoded information referring to, among other things, the source file, a timestamp, binary media format, id numbers or values, or the content itself (e.g., the full text of a comment). The identifier may be the object that is mapped to the digital-video time segment so that the actual content can later be retrieved during playback to minimize the size of the data structure used for mapping.

The system also may include one or more classifiers that receive audio, video, and chat content information portions and classify them to determine an appropriate mapping. Classifiers may include a visual classifier 362, an audio classifier 364, or a textual classifier 366. For example, the visual classifier 362 may be used to identify frames or other visual elements from the underlying digital video in the video stream included in the identified content information. Likewise, the audio classifier 364 may identify words spoken by one or more participants and the textual classifier 366 may identify chat comments or other typed annotations included in the identified content information.

The output of the classifiers may be used to determine a suitable mapping procedure for each content item. For example, video conference information received as plain text and extracted by content extraction module 350 may be immediately classified by textual classifier 366 and processed for subsequent mapping by content processing 360. However, video conference information may be received as images, video or audio, which can contain content that requires additional processing by statistical tools, computer vision modules, optical character recognition ("OCR") modules, machine learning models, and so on. In some examples, metadata included with the video conference information can include information for directly mapping video-conference time segments to digital-video time segments by content mapping and grouping module 370, without added input from content extraction module 350.

Content processing 360 can prepare the various content items to be mapped onto the underlying digital video. For example, the textual classifier 366 may classify content items as chat data and extract them from the chat portion of video conference information, so they can be added to a suitable data structure. This data structure may be mapped to the underlying digital video and can take the form of a machine-readable standardized or proprietary data structure, which is appropriate for writing to a computer-readable medium or transmitting. Some standardized formats like XML, JSON, or YAML may be used. In some examples, unstructured text-based, compressed, and/or binary data formats can be utilized to save space and bandwidth.

The system 110 then maps the first content information onto the first digital-video time segment associated with the first video-conference time segment at 708. The content mapping and grouping module 370 may perform steps for persisting the mapping including, for example, writing a suitable data structure directly to the underlying video file, maintaining a mapping in a separate file, or creating a mapping in a database, among other possibilities for generating and persisting the mapping. Likewise, content items may be grouped using a procedure suitable for grouping elements of content items from a video-conference time segment together on a digital-video time segment. For example, a binning procedure could be used whereby any chat messages performed inside a certain time bound are identified as grouped into a digital-video time segment.

For example, consider video conference information segmented into video-conference time segments V1 and V2, including content items C1 and C2, respectively and a digital video segmented into digital-video time segments D1 and D2. An associative array or similar data structure can be used to track the association as well as the mapping. Content items C1 and C2 may be represented by suitable identifiers, as discussed above. In this example, the keys of the associative array are references to the video-conference time segments and the values of the associative array are themselves associative arrays, with keys references to the digital-video time segments and values collections containing mapped content items. In pseudocode this may be written as (V1=>(D1=>{C1}), V2=>(D2=>{C2})).

At block 712, the system 110 causes the first content information to be displayed during a displaying of the digital video. For example, the system may render the digital video, in which the rendered digital video includes the mapped content information. If the mapped content information is in a separate file, the mapping information from the file may be written onto the file containing the digital video as metadata. When the video is subsequently replayed using a suitable video player that can read the metadata, the mapped content information can be displayed back along with the video. For example, the digital video can be rendered showing the video along with a comments box that includes transcribed audio, chat comments, descriptions, annotations, and so on. In some examples, the mapped content may be retrieved using the content information identifiers as a key.

In some other examples, the unaugmented digital video may be played back while the mapping is loaded and added to the displayed video playback at playback time. For example, a data structure similar to the example given in block 714 may be persisted in video storage module 330. When playback of the video is requested by a client of video production server 320, the mapping can be loaded from video storage module 330 and rendered to the display device as the video is played back. For instance, if the digital video is referenced in the mapping using time bounds or frame numbers, those references can be used to determine the appropriate time to display the mapped collections during playback.

Figure 8:
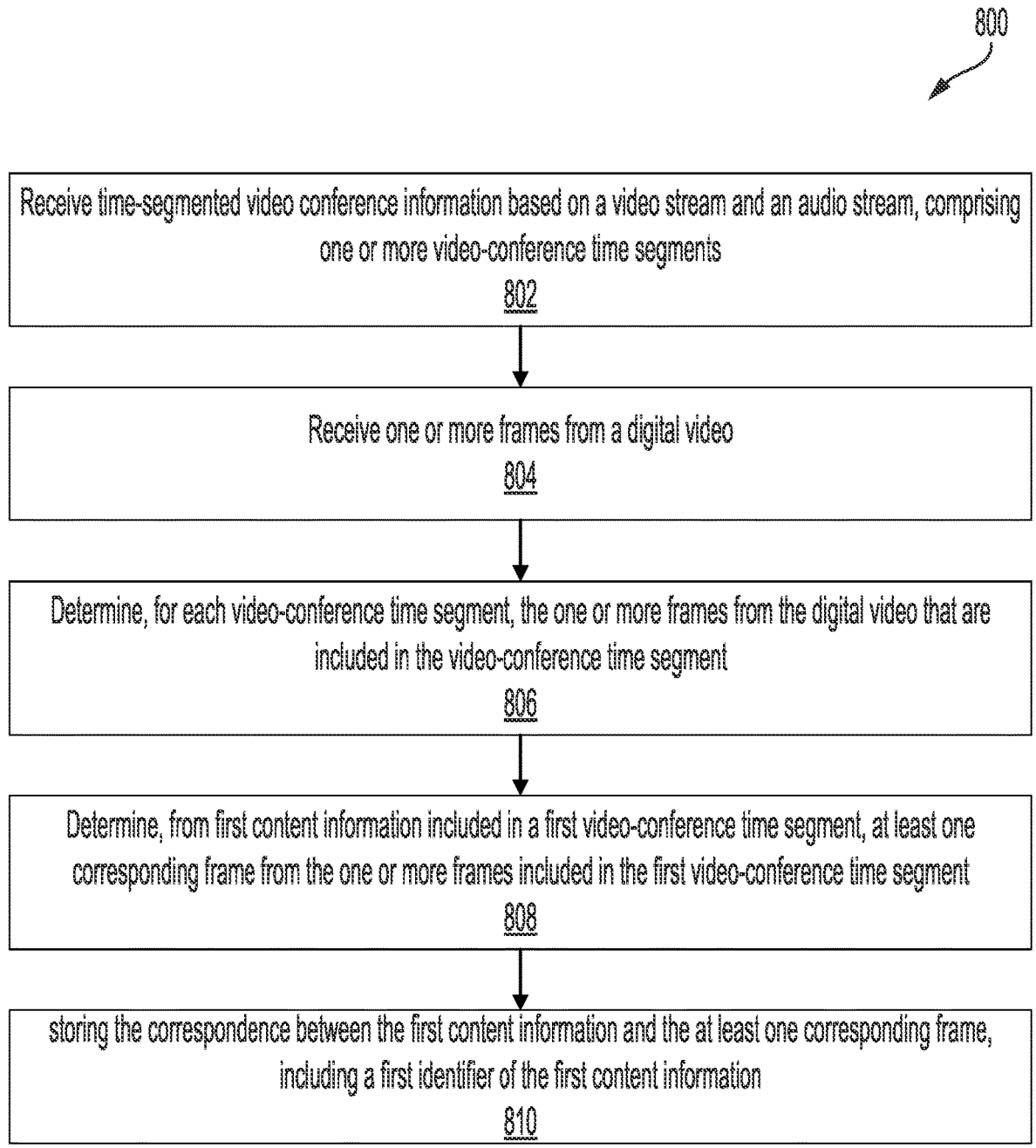
FIG. 8 illustrates an example process performed by a system for mapping video conferencing content to video frames, according to some examples of the present disclosure.

VI. Example Process for a System for Mapping Video Conferencing Content to Video Frames FIG. 8 illustrates an example process 800 used by an example system for mapping video conferencing content to video frames. For illustrative purposes, the process 800 is described with reference to the components illustrated in FIG. 3 from the perspective of the video conferencing content mapping system 110, though other implementations are possible. For example, video conference segmentation 342 and digital video segmentation 344 may be in stand-alone modules. In some examples, video segmentation may be performed externally to the system 110.

At block 802, the system 110 receives, from a segmentation module, time-segmented video conference information, comprising one or more video-conference time segments. Similar to block 704, the segmentation module segments the video conference information into one or more video-conference time segments, each including content information.

At block 804, the system 110 receives (e.g., from a video production server 320), one or more frames from a digital video or videos. The frames may be received in any suitable format for editing and mapping. For example, the frames may be included in digital video files or may be individual image files like JPGs, GIFs, TIFFs, BMPs, and so on. Alternatively, the frames of the digital video may be streamed to the system 110 from video production server 320.

At block 806, the system 110 determines, for each video-conference time segment, the one or more frames from the digital video that are included in the video-conference time segment. This block is similar to block 708, in which the system 110 associates each video-conference time segment with a digital-video time segment. However, in this example, the association is from video-conference time segment to one or more digital video frames. A data structure similar to the one exemplified in block 710 may be used. However, instead of a reference to digital-video time segments, the reference is to a specific frame or frames.

At block 808, the system 110 determines, from video conference information included in each video-conference time segment, at least one corresponding frame from the one or more frames included in each video-conference time segment. For example, the content extraction module 350 may identify, extract, and classify content items that may be suitable for mapping to the underlying digital video frames. The content mapping and grouping module 370 may perform steps determining the correspondence including mapping and grouping of content items to digital video frames, similar to the process described in block 710.

At block 810, the system 110 stores the correspondence between the video conference information and the at least one corresponding frame, including a first identifier of the first content information. The correspondence may be persisted by, for example, writing a suitable data structure directly to the underlying video file, maintaining the correspondence in a separate file, or writing the correspondence in a database using a suitable data structure, among other techniques suitable for persisting the correspondence. In some examples, the mapped content may be retrieved using the content information identifiers as a key. In some other example systems, the correspondence is ephemerally stored in mapping and video cache 395 prior to persistent storage in, for example, video storage module 330.

VII. Example of a Computing Environment

Figure 9:
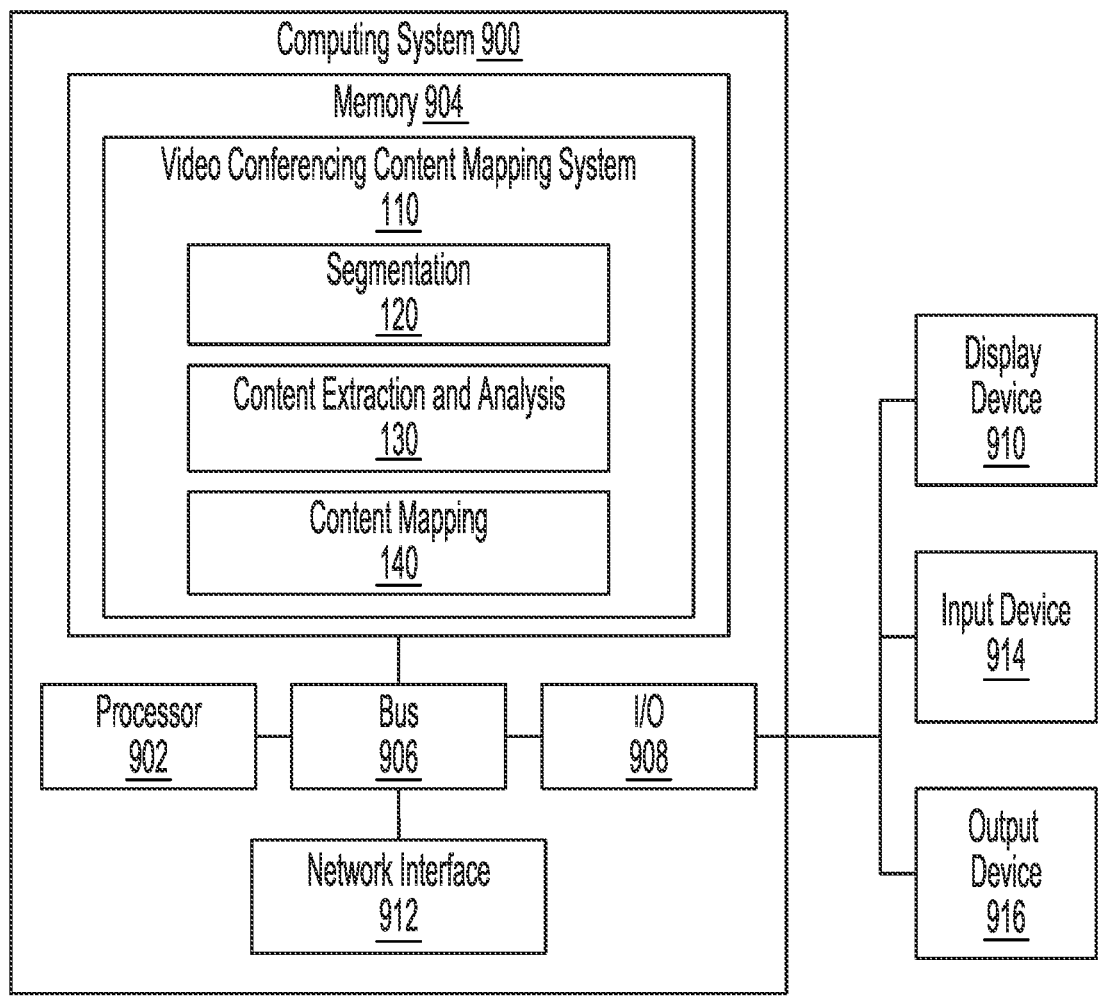
FIG. 9 depicts a computing environment that can be used for mapping video conferencing content to video frames, according to some examples of the present disclosure.

Any suitable computing system or group of computing systems can be used for performing the operations described herein. For example, FIG. 9 depicts a computing system 900 that can implement any of the computing systems or environments discussed above. In some embodiments, the computing system 900 includes a processing device 902 that executes the program code making up the components of video conferencing content mapping system 110, a memory that stores various data computed or used by the components of system 110 (e.g., segmentation 120, content extraction and extraction 130, or content mapping 140), an input device 914 (e.g., a mouse, a stylus, a touchpad, a touchscreen), and an output device 916 that presents output to a user (e.g., a display device that displays graphical content generated by the system 110). For illustrative purposes, FIG. 9 depicts a single computing system which executes the program code making up the components of video conferencing content mapping system 110, in which the input device 914 and output device 916 are present. But these applications, datasets, and devices can be stored or included across different computing systems having devices similar to the devices depicted in FIG. 9.

The example of FIG. 9 includes a processing device 902 communicatively coupled to one or more memory devices 904. The processing device 902 executes computer-executable program code stored in a memory device 904 (or memory component), accesses information stored in the memory device 904, or both. Examples of the processing device 902 include a microprocessor, an application-specific integrated circuit ("ASIC"), a field-programmable gate array ("FPGA"), or any other suitable processing device. The processing device 902 can include any number of processing devices, including a single processing device.

The memory device 904 includes any suitable non-transitory, machine-readable storage medium for storing data, program code, computer program product, or a combination thereof. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 900 may also include a number of external or internal devices, such as a display device 910, or other input or output devices. For example, the computing system 900 is shown with one or more input/output ("I/O") interfaces 908. An I/O interface 908 can receive input from input devices or provide output to output devices. One or more buses 906 are also included in the computing system 900. Each bus 906 communicatively couples one or more components of the computing system 900 to each other or to an external component.

The computing system 900 executes program code that configures the processing device 902 to perform one or more of the operations described herein. The program code includes, for example, the program code making up the components of video conferencing content mapping system 110 or other suitable applications that perform one or more operations described herein. The program code may be resident in the memory device 904 or any suitable computer-readable medium and may be executed by the processing device 902 or any other suitable processor. In some embodiments, all modules in system 110, including the modules shown for segmentation 120, content extraction and extraction 130, or content mapping 140 are stored in the memory device 904, as depicted in FIG. 9. In additional or alternative embodiments, one or more of the components of system 110 are stored in different memory devices of different computing systems.

In some embodiments, the computing system 900 also includes a network interface device 912. The network interface device 912 includes any device or group of devices suitable for establishing a wired or wireless data connection to one or more data networks. Non-limiting examples of the network interface device 912 include an Ethernet network adapter, a modem, and/or the like. The computing system 900 is able to communicate with one or more other computing devices (e.g., a computing device that receives inputs for system 110 or displays outputs generated by the components of system 110) via a data network using the network interface device 912.

An input device 914 can include any device or group of devices suitable for receiving visual, auditory, or other suitable input that controls or affects the operations of the processing device 902. Non-limiting examples of the input device 914 include a touchscreen, stylus, a mouse, a keyboard, a microphone, a separate mobile computing device, etc. An output device 916 can include any device or group of devices suitable for providing visual, auditory, or other suitable sensory output. Non-limiting examples of the output device 916 include a touchscreen, a monitor, a separate mobile computing device, etc.

Although FIG. 9 depicts the input device 914 and the output device 916 as being local to the computing device that executes the program code making up the components of video conferencing content mapping system 110, other implementations are possible. For instance, in some embodiments, one or more of the input devices 914 and output devices 916 include a remote client-computing device that communicates with the computing system 900 via the network interface device 912 using one or more data networks described herein.

VIII. General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method comprising:
receiving video conference information and a digital video, the digital video including a plurality of frames, wherein the video conference information includes a video stream and an audio stream;
segmenting the video conference information into one or more video-conference time segments;
segmenting the digital video into one or more digital-video time segments;
associating each video-conference time segment with a digital-video time segment;
mapping first content information of a first video-conference time segment of the one or more video-conference time segments onto a first digital-video time segment associated with the first video-conference time segment based on a first identifier of the first content information; and
causing the first content information to be displayed during a displaying of the digital video.

2. The method of claim 1, wherein:
each video-conference time segment includes content information including the video conference information associated with the video-conference time segment; and
each digital-video time segment includes one or more frames of the plurality of frames of the digital video.

3. The method of claim 1, wherein causing the digital video to be displayed comprises:
determining, by a video production server, the first content information using the first identifier of the first content information; and
displaying the digital video, by the video production server.

4. The method of claim 3, wherein the first content information displayed during the displaying of the digital video includes at least textual chat messages or transcribed spoken words.

5. The method of claim 3, wherein the first content information displayed during the displaying of the digital video is displayed during one or more frames included in the first digital-video time segment.

6. The method of claim 1, wherein the video conference information includes at least one of chat message information, reaction information, or annotation information.

7. The method of claim 1, further comprising:
identifying, from the audio stream, one or more spoken words, wherein the first content information includes the one or more spoken words; and
identifying, from the video stream, a first frame of the plurality of frames of the digital video.

8. The method of claim 1, wherein:
the video conference information is received from a video conferencing platform; and
the digital video is received from a video production server.

9. The method of claim 1, further comprising:
identifying the first content information from the first video-conference time segment of the one or more video-conference time segments, comprising:
extracting undesignated content information from the first video-conference time segment;
classifying the undesignated content information using at least one of a textual classifier, a video classifier, or an audio classifier;
designating the undesignated content information as the first content information; and
embedding the first content information in a data structure.

10. The method of claim 9, wherein:
at least one of the textual classifier, the video classifier, or the audio classifier is based on a machine learning model trained to classify the undesignated content information;
the machine learning model generates a probability that the undesignated content information is relevant; and
designating the undesignated content information as the first content information s responsive to the probability exceeding a predefined threshold probability.

11. The method of claim 1, further comprising:
identifying second content information from the first video-conference time segment;
mapping the second content information of the first video-conference time segment of the one or more video-conference time segments onto the first digital-video time segment associated with the first video-conference time segment based on a second identifier of the second content information; and
grouping the first content information and the second content information on the first digital-video time segment associated with the first video-conference time segment.

12. A system, comprising:
a memory component; and
one or more processing devices coupled to the memory component configured to perform operations comprising:
receiving, from a segmentation module, time-segmented video conference information, comprising one or more video-conference time segments, wherein the time-segmented video conference information is based on at least a video stream and an audio stream;
receiving one or more frames from a digital video;
determining, for each video-conference time segment, the one or more frames from the digital video that are included in the video-conference time segment;
determining, from content information included in each video-conference time segment, at least one corresponding frame from the one or more frames included in the video-conference time segment; and
storing the correspondence between the content information and the at least one corresponding frame in a memory device, including an identifier of the content information.

13. The system of claim 12, wherein the content information included in each video-conference time segment includes at least one of chat message information, reaction information, or annotation information.

14. The system of claim 12, wherein the time-segmented video conference information is based on the video stream and at least a portion of the digital video is included in the video stream.

15. The system of claim 12, wherein the one or more frames from the digital video are received from a video production server.

16. A non-transitory computer-readable storage medium storing processor-executable instructions configured to cause one or more processors to perform operations including:
- receiving time-segmented video conference information based on a video stream and an audio stream, comprising one or more video-conference time segments;
- receiving one or more frames from a digital video;
- determining, for each video-conference time segment, the one or more frames from the digital video that are included in the video-conference time segment;
- determining, from first content information included in a first video-conference time segment, at least one corresponding frame from the one or more frames included in the first video-conference time segment; and
- storing the correspondence between the first content information and the at least one corresponding frame, including a first identifier of the first content information.

17. The non-transitory computer-readable storage medium of claim 16, wherein the first content information included in each video-conference time segment includes at least one of chat message information, reaction information, or annotation information.

18. The non-transitory computer-readable storage medium of claim 16, wherein the time-segmented video conference information is based on the video stream and at least a portion of the digital video is included in the video stream.

19. The non-transitory computer-readable storage medium of claim 16, wherein the one or more frames from the digital video are received from a video production server.

20. The non-transitory computer-readable storage medium of claim 16, further comprising:
- identifying second content information from the first video-conference time segment;
- determining, from the second content information included in the first video-conference time segment, the at least one corresponding frame from the one or more frames included in the first video-conference time segment; and
- grouping the first content information and the second content information on the at least one corresponding frame, including the first identifier of the first content information and a second identifier of the second content information.

* * * * *